US010007396B2

(12) United States Patent
Jeong et al.

(10) Patent No.: US 10,007,396 B2
(45) Date of Patent: Jun. 26, 2018

(54) METHOD FOR EXECUTING PROGRAM AND ELECTRONIC DEVICE THEREOF

(71) Applicant: Samsung Electronics Co., Ltd., Gyeonggi-do (KR)

(72) Inventors: Jin-Hong Jeong, Gyeonggi-do (KR); Jung-Hun Kim, Gyeonggi-do (KR); Bo-Kun Choi, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 640 days.

(21) Appl. No.: 14/297,519

(22) Filed: Jun. 5, 2014

(65) Prior Publication Data

US 2014/0365970 A1    Dec. 11, 2014

(30) Foreign Application Priority Data

Jun. 5, 2013  (KR) ........................ 10-2013-0064926

(51) Int. Cl.
*G06F 3/0482* (2013.01)
*G06F 3/0481* (2013.01)
(Continued)

(52) U.S. Cl.
CPC ........ *G06F 3/0482* (2013.01); *G06F 3/04817* (2013.01); *G06F 3/04842* (2013.01); *G06F 9/445* (2013.01); *G06F 9/4443* (2013.01)

(58) Field of Classification Search
CPC ............... G06F 3/0482; G06F 3/04817; G06F 3/04842; G06F 9/445; G06F 9/4443;
(Continued)

(56) References Cited

U.S. PATENT DOCUMENTS 8,589,911 B1 * 11/2013 Sharkey ................... G06F 8/61
717/173
2006/0294063 A1    12/2006 Ali et al.
(Continued)

FOREIGN PATENT DOCUMENTS

KR    10-2007-0096274    10/2007
KR    10-2009-0058131    6/2009

OTHER PUBLICATIONS

Extended European Search Report dated Sep. 26, 2014 in connection with European Patent Application No. EP14171149; 8 pages.
(Continued)

*Primary Examiner* — Nicholas Ulrich

(57) ABSTRACT

A method in an electronic device, includes receiving an instruction including an implicit call, identifying at least one program corresponding to the instruction of the implicit call, when a number of the identified program is more than one, providing a first program of the identified program corresponding to the implicit call, and displaying a second program of the identified program corresponding to the implicit call during running of the first program. An electronic device includes a processor configure to create an object representing an implicit call, provide a plurality of programs to created object, determine a first program among the plurality of programs, and execute the first program when the object is selected, and provide at least one second program among the programs during executing the first program.

11 Claims, 17 Drawing Sheets

(51) Int. Cl.
*G06F 3/0484* (2013.01)
*G06F 9/445* (2018.01)
*G06F 9/44* (2018.01)

(58) Field of Classification Search
CPC . G06F 9/44; H04M 1/72522; H04M 1/72583; H04M 1/72586
See application file for complete search history.

(56) References Cited

U.S. PATENT DOCUMENTS

| | | | |
|---|---|---|---|
| 2007/0049262 A1* | 3/2007 | Jung | G06F 3/04895 455/418 |
| 2007/0271293 A1* | 11/2007 | Peng | G06F 1/1626 |
| 2009/0254900 A1 | 10/2009 | Nakamura | |
| 2010/0011321 A1* | 1/2010 | Nakayama | G06F 3/04817 715/811 |
| 2010/0066698 A1* | 3/2010 | Seo | G06F 3/04883 345/173 |
| 2010/0175020 A1* | 7/2010 | Kim | H04M 1/72522 715/783 |
| 2011/0202821 A1 | 8/2011 | Roy et al. | |
| 2011/0320977 A1* | 12/2011 | Bahn | G06F 3/0481 715/810 |
| 2013/0018867 A1 | 1/2013 | Regan et al. | |
| 2013/0080964 A1* | 3/2013 | Shigeta | G06F 3/0488 715/773 |
| 2013/0159234 A1* | 6/2013 | Xing | H04M 1/72569 706/46 |
| 2013/0283274 A1* | 10/2013 | Mimran | G06F 9/46 718/100 |
| 2014/0189572 A1* | 7/2014 | Martens | G06F 3/04817 715/780 |
| 2014/0223112 A1* | 8/2014 | Serjeanston | H04L 67/04 711/147 |
| 2014/0223372 A1* | 8/2014 | Dostie | G06F 3/0482 715/813 |
| 2015/0262583 A1* | 9/2015 | Kanda | H04N 5/232 704/275 |

OTHER PUBLICATIONS

Foreign Communication from Related Counterpart Application; European Patent Application No. 14171149.9; Communication Pursuant to Article 94(3) EPC dated Jul. 6, 2017; 5 pages.

* cited by examiner

METHOD FOR EXECUTING PROGRAM AND ELECTRONIC DEVICE THEREOF

PRIORITY

The present application is related to and claims priority under 35 U.S.C. § 119 to an application filed in the Korean Intellectual Property Office No. 10-2013-0064926 on Jun. 5, 2013, the contents of which are incorporated herein by reference.

TECHNICAL FIELD

The present disclosure relates to an electronic device and in particular to a method for processing data and an electronic device thereof.

BACKGROUND

With the development of mobile communication technology, an electronic device is used as an essential communication device for individuals. In addition, with the execution of various supplementary services, such as a camera, data communication, video replay, audio replay and messenger, schedule management, alarm functions in addition to a voice communication function in the electronic device, various programs for providing the functions have been used and the number of programs installed in the electronic device has increased.

In the related art, when a program is executed in an electronic device, the electronic device searches icons for executing programs which are arranged on the display unit of the electronic device, and selects and executes the program. As the number of programs installed in the electronic device increases, the method for directly searching for and executing a program become complicated because of the complexity of the process of searching for and executing a desired program.

In addition, the electronic device may execute a program using a command for executing one specific program provided by the electronic device. The electronic device may display two or more programs having an identical function and select and execute one of the displayed programs.

SUMMARY

To address the above-discussed deficiencies, it is a primary object to provide a method and apparatus for searching for programs associated with an executed program from a database, displaying the found programs on an electronic device that executes the program, and executing a program that provides an identical or similar function to that of the executed program.

Another object of the present disclosure is to provide a method and apparatus for executing a program that provides an identical or similar function to that of a program executed by an implicit call instead of the executed program.

According to an aspect of the present disclosure, a method in an electronic device, includes receiving an instruction including an implicit call, identifying at least one program corresponding to the instruction of the implicit call, when a number of the identified program is more than one, providing a first program of the identified program corresponding to the implicit call, and displaying a second program of the identified program corresponding to the implicit call during running of the first program.

Providing the first program corresponding to the implicit call may include: displaying programs corresponding to the implicit call from a database; and providing determined one of the programs as the first program.

Providing the first program corresponding to the implicit call may include providing a previously selected and stored program as the first program.

Displaying the second program may include displaying an icon or link of the second program.

According to another aspect of the present disclosure, a method for operating an electronic device includes: providing programs corresponding to selected object information; determining a first program among the provided programs; and providing at least one second program among the programs during execution of the first program.

Providing the program may include displaying an icon or link including a command for executing the program.

The method may further include: executing the second program; and displaying the first program during execution of the second program.

The method may further include displaying a third program including the programs during execution of the second program.

The method may further include displaying relevant programs which are associated with the second program and are obtained from a database of the electronic device.

The method may further include performing or releasing display of the programs or the relevant programs on an execution screen of the first program or an execution screen of the second program through a predetermined gesture or motion.

The object information may be information included in an object, and may include one or more of pieces of information about a function, purpose, keyword, identification (ID), and category of a program, and a list of peripherals of the electronic device that are useable by the program.

The database may include one or more of pieces of information about a function, purpose, keyword, identification (ID), and category of a program, and a list of peripherals of the electronic device that are useable by the program.

Providing the programs may include providing the programs through at least one of a display on a notification bar or notification window and a voice output.

The method may further include displaying a menu for determining whether to set the first program to a default program corresponding to an object.

The method may further include displaying a third program that is not included in the programs on an execution screen of the first program.

A method for operating an electronic device, includes selecting an object representing an implicit call, providing a plurality of programs to the selected object, executing a first program among the plurality of programs; and providing at least one second program of the plurality of programs during executing of the first program.

A method for operating an electronic device, includes creating an object representing an implicit call, providing a plurality of programs to the created object, determining a first program among the plurality of programs, and executing the first program when the object is selected, providing at least one second program of the plurality of programs during executing of the first program.

According to another aspect of the present disclosure, an electronic device includes a processor configure to create an object representing an implicit call, provide a plurality of programs to created object, determine a first program among the plurality of programs, and execute the first program when the object is selected, and provide at least one second program among the programs during executing the first program.

The processor may further control: executing a third program which is not include in the programs; and displaying the first program and/or the second program during running of the third program.

The processor may further control displaying the first program and/or the second program using an icon or link or outputting the first program and/or the second program in a voice manner.

The processor may further control: executing the second program; and displaying the first program on an execution screen of the second program.

The processor may further control performing or releasing display of the programs or the relevant programs on an execution screen of the first program or an execution screen of the second program by performing a reference operation.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
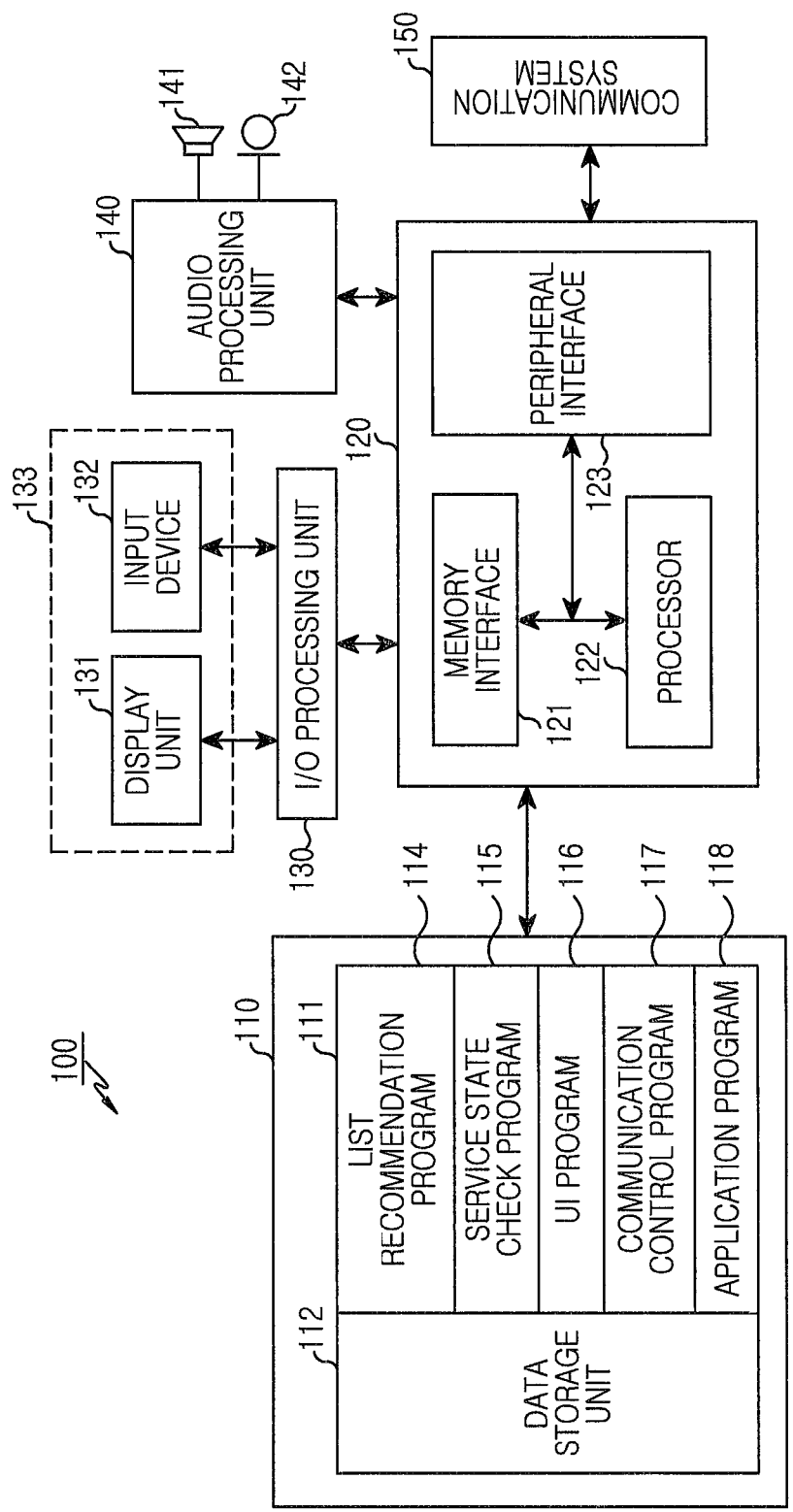
FIG. 1 illustrates a block configuration of an electronic device according to various embodiments of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged. Exemplary embodiments of the present disclosure will be described herein below with reference to the accompanying drawings. In the following description, detailed descriptions of well-known functions or configurations will be omitted since they would unnecessarily obscure the subject matters of the present disclosure. Also, the terms used herein are defined according to the functions of the present disclosure. Thus, the terms may vary depending on users' or operators' intentions or practices. Therefore, the terms used herein should be understood based on the descriptions made herein.

In the following description of various embodiments of the present disclosure, an electronic device will be described to include a touchscreen in which an input process through an input device and a display process through a display unit can be performed on one screen. Therefore, although a display unit and an input device are illustrated separately in a device configuration of the present disclosure, the display unit can include the input device or the input device can include the display unit.

The present disclosure is not limited to an electronic device having a touchscreen, and can be applicable to various electronic devices, for example, an electronic device in which a display unit and an input device is physically separated or discriminated from each other and an electronic device having only one of the display unit and the input device. In the following embodiments, a device displayed as a touchscreen can represent an electronic device having a display unit, such as a touchscreen having a touch-type input device, a display unit that does not have a touch-type input device, and a display unit having an input device.

In the following description, examples of the electronic device 100 include a mobile communication terminal, a personal digital assistant (PDA), a personal computer (PC), a laptop computer, a smart phone, a smart TV, a netbook, a mobile internet device (MID), an ultra mobile personal computer (UMPC), a tablet PC, a mobile pad, a media player, a handheld computer, a navigation device, a smart watch, a Head Mounted Display (HMD), and a MPEG-1 Audio Layer-3 (MP3) player.

When it is stated that one component is "connected" or "linked" to another component, the one component can be directly connected or linked to another component. However, it will be understood that yet another component can exist therebetween. On the other hand, when it is described that one component is "directly connected" or "directly linked" to another component, it will be understood that yet another component does not exist therebetween.

In the present disclosure, the electronic device 100 can control an UI operation of the electronic device 100 or an operation of a program by generating a call including a command for controlling a program, a component or data.

The call of the electronic device 100 can include an explicit call and an implicit call.

An explicit call can be a call that specifies an object called by a command. A first program corresponding to a command can be directly executed by selecting an activity component, such as an icon, including a command for executing a first camera program of camera programs of the electronic device 100 or by inputting a voice command.

An implicit call can be a call that does not specify an object called by a command. A command included in the implicit call can be executed by selecting an activity component, such as an icon, or by inputting a voice command like the explicit call. However, the command included in the implicit call can be a command in which a target program to be executed is not explicitly determined.

In addition, a command included in the implicit call can be object search information. The electronic device 100 can filter out or search for programs corresponding to object search information from a database stored in a memory 100. Therefore, a command included in the implicit call can be described as search information of a selected object.

The electronic device 100 can filter out programs corresponding to object search information of an implicit call through a list recommendation program 114 when the implicit call is generated. The electronic device 100 can display a list of filtered programs by configuring an UI operation on a touchscreen 133 or second display unit of the electronic device 100 or output the list of filtered programs in a voice manner. The list of programs displayed by the electronic device 100 can be configured by an UI object including an explicit call or voice command.

When the implicit call is generated, a default program can be set such that one program is executed without displaying the list of filtered programs. The implicit call which the default program is set corresponding to can be executed like an explicit call.

The electronic device 100 can include a second activity that generates a call including a command for executing a camera program in a first activity (UI operation configuration for a first program).

In a case where the second activity generates an explicit call for executing a second program, when the electronic device 100 does not include the second program in the memory 110, the electronic device 100 may not execute the camera program in the first program.

In a case where the second activity generates an implicit call for executing the camera program, the electronic device 100 can filter out camera programs corresponding to object search information of the implicit call from the database through a list recommendation program 114.

The electronic device 100 can configure a database using information about functions and purposes, keywords, and ID (Identification) codes of programs, and peripherals of the electronic device 100 which are usable by programs. The information can be obtained from headers of data, data including program information, or data including information about functions which can be executed by a program package installed in the electronic device 100 or available peripherals of the electronic device 100. When an implicit call is generated, the electronic device 100 can filter out programs corresponding to information provided by the implicit call from program information of the database.

FIG. 1 illustrates a block configuration of an electronic device according to various embodiments of the present disclosure.

Referring to FIG. 1, the electronic device 100 can include a memory 110, a processor unit 120. In addition, the electronic device 100 can include, as peripherals, an input/output processing unit 130, display unit 131, an input device 132, an audio processing unit 140, a communication system 150, and other peripherals.

Respective components will be described below.

The memory 110 can include a program storage unit 111 for storing a program for controlling an operation of the electronic device 100 and a data storage unit 112 for storing data generated during the execution of a program, and can store data or the like generated by the program according to the operation of the processor 122.

For example, the electronic device 100 can configure a database using information about functions and purposes, keywords and ID (Identification) codes of programs, and information about peripherals of the electronic device 100 which are usable by programs for processing of data of programs and store the database in the data storage unit 112. The information can configure a condition for filtering out a program corresponding to an implicit call (implicit intent of android, selection of a connection program of Window) command or a condition for searching for a program corresponding to a command for executing a program or searching for a program for playing back, providing, editing and using specific data. The information can be a reference based on which the programs can be classified. When an implicit call is generated, the electronic device 100 can filter out programs corresponding to information provided by the implicit call from program information of the database.

The program storage unit 111 can include at least one application program 113, a user interface (UI) program 116, a communication control program 118, and an input/output control program 117. Herein, the programs stored in the program storage unit 111 can be configured by a collection of instructions and can be expressed as an instruction set.

The list recommendation program 114 can search or filter a database included in the memory 110 of the electronic device 100 based on object search information of an implicit call when the electronic device 100 executes a program through the implicit call, obtain a list of programs corresponding to the information, and display the list on the electronic device 100.

In addition, when a program is executed through an explicit call, the electronic device 100 can search or filter the database included in the memory 110 of the electronic device 100 based on information of the explicit call, obtain a list of programs associated with information of programs to be executed, and display the list on the electronic device 100.

In addition, the list recommendation program 114 can establish a database using information about programs included in the memory 110 of the electronic device 100.

The information can be obtained from headers of data, data including program information, data including information about functions which can be executed by a program package installed in the electronic device 100 or peripherals used by the electronic device 100, and programs included in the memory 110 of the electronic device 100.

For example, the list recommendation program 114 can obtain pieces of information about functions and purposes, keywords, ID (Identification) codes of programs included in the memory 110 of the electronic device 100, available peripherals of the electronic device 100, a number of times that a program is executed, a time point at which a program has started lately, a program set as a default program, a program which had been set as a default program, and change history for a default program, and classify the pieces of information to configure lists. In addition, information about a number of times that programs included in the memory 110 of the electronic device 100 have been downloaded, a download rank, whether there is an event, programs provided for an event, and programs recommended for download can be obtained from a server for downloading programs of Internet, and can be added to the database.

The service state check program 115 can include at least one software component for identifying a state of a service provided by a program or a configuration device.

For example, the service state check program 115 can identify that an implicit call is generated in the electronic device 100, and identify that an operation of searching for a program corresponding to object search information of the implicit call from a database of the memory 110 of the electronic device is performed through the list recommendation program 114.

As another example, the service state check program 115 can identify a state where one of programs corresponding to object search information of the implicit call is selected and executed in the electronic device, and a state where one or more of the programs corresponding to the implicit call are displayed on the touchscreen 133 on which the UI operation of the selected program is being displayed.

The user interface (UI) program 116 can include at least one command, software component for providing a user interface (UI) to the electronic device 100.

For example, the UI program 114 can convert codes, such as standard character encoding or character collection, used by the electronic device 100, into corresponding characters or sound and display the same on the touchscreen 133 of the electronic device or output the same through the speaker 141.

As another example, the user interface program 114 configures an UI or GUI using an icon including a command for executing programs obtained by searching a database based on object search information of the implicit call of the electronic device 100 or an image including a link and displays the same on the touchscreen 133.

The I/O control program 117 can display operations of the electronic device 100 on the display unit 131 and receive an instruction for an operation of the electronic device 100 through the input device 132.

The communication control program 117 can include at least one software component for controlling communication with at least one second electronic device using the communication system 150.

For example, the communication control program 117 can search for a second electronic device for communication connection. When the second electronic device for communication connection is found, the communication control unit 117 can set a connection for communication with the second electronic device. Thereafter, the communication control program 117 investigates the performance of the second electronic device connected to the electronic device and performs a session establishment process to enable the communication system 150 to transmit and receive data, such as alarm information, to and from the second electronic device.

The application program 113 can include a software component for at least one application program installed in the memory 110 of the electronic device 100.

The memory 110 included in the electronic device 100 can be configured in plurality. In addition, the memory 110 can perform only the function of the program storage unit 111 or data storage unit 112 or both the functions according to what it is used for. The physical division between internal storage areas in the memory 110 may not be definite.

The processor unit 120 includes a memory interface 121, at least one processor 122, and a peripheral interface 123. In this case, the memory interface 121, the at least one processor 122 and the peripheral interface 123 which are included in the processor unit 120 can be integrated into at least one circuit or be implemented as separate elements.

The memory interface 121 can control access to the memory 100 of components, such as the processor 122 or the peripheral interface 123.

The peripheral interface 123 can control connections of the input/output peripherals of the electronic device 100 to the processor 122 and the memory interface 121.

The processor 122 can enable the electronic device 100 to provide various services, such as multimedia or communication services, using at least one software program, perform display on the display unit 131 to enable a user to see the UI operation of the electronic device through the I/O processing unit 130, and enable an input device (not illustrated) or the touch input device 132 to provide a service for receiving an instruction from the outside of the electronic device. In this case, the processor 122 can perform control to execute at least one program stored in the memory 110 and provide a service corresponding to the program.

The audio processing unit 140 can provide an audio interface between a user and the electronic device 100 through a speaker 141 and a microphone 142.

For example, the electronic device 100 can perform control to enable input of a predetermined voice command for executing an implicit call to the microphone 142 and to notify a service performed by the electronic device 100 or output a list of programs obtained by searching a database based on object search information of the implicit call in a voice manner through the speaker 141.

The communication system 150 performs a communication function. The communication system 150 can perform communication with a second electronic device using at least one of mobile communication through a base station, infrared wireless communication, Bluetooth, near filed wireless communication, such as Wireless Fidelity, wireless LAN communication and wired communication.

The input/output processing unit 130 can provide an interface between an input/output device, such as the display unit 131 and the input device 132, and the peripheral interface 123.

The input device 132 can provide input data generated by the selection of the user to the processor unit 120 through the input/output processing unit 130.

For example, the input device 132 can be configured by only control buttons or a key pad in order to receive data for control from the outside of the electronic device 100.

The other input device 132 can be included and provided in the display unit 132 like the touchscreen 133. In this case, the input device 132 of the touchscreen 133 can use a capacitive type, a resistive type (detection of pressure), an infrared type, an electromagnetic induction type and an ultrasonic type.

The display unit 131 can receive the state information of the electronic device 100, characters input from the outside, moving pictures, still pictures (hereinafter, referred to as an image), or the like from the processor unit 120, configure an UI operation, and display the same through the input/output processing unit 131.

The touchscreen 133 is a device in which the display unit 131 is integrated physically with the touch-type input device 132, and can receive a command by touching a screen configuration displayed on the display unit 131 with the operation of the electronic device 100.

Since the touchscreen 133 performs both the function of the display unit 131 for displaying an UI operation of the electronic device 100 and the function of the input device 132 of inputting an external command to the electronic device 100, the display unit 131 of the touchscreen 133 and the input device 132 of the touchscreen 133 can be indicated by the touchscreen 133.

In the description of embodiments of the present disclosure, displaying or outputting through the electronic device 100 can be performed by displaying moving pictures, still pictures or GUI operations on the touchscreen 133 of the electronic device 100 or by outputting audio, such as signal sound or voice, through the speaker 141. In the following description, expression "displaying" or "outputting" can be used. If there is a need for discrimination between them, separate descriptions for them will be provided.

Figure 2:
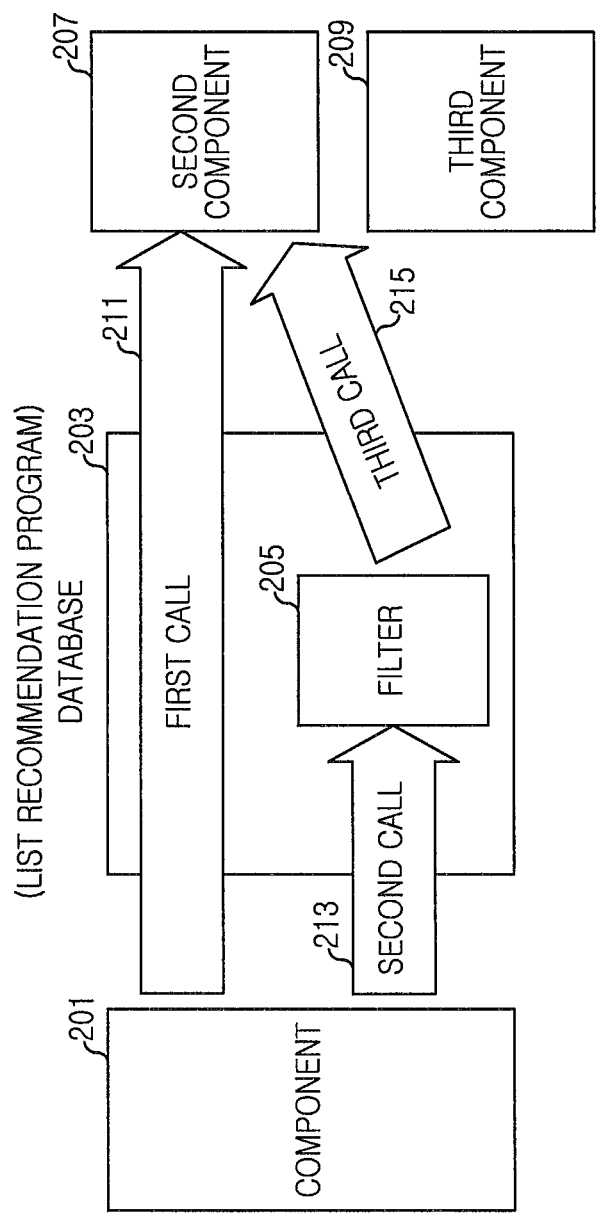
FIG. 2 is a diagram illustrating an operation according to a call of an electronic device according to embodiments of the present disclosure.

FIG. 2 illustrates an operation corresponding to a call from an electronic device according to embodiments of the present disclosure. Referring to FIG. 2, the electronic device 100 can communicate with a user through a component configured by a software module capable of processing programs.

Referring to FIG. 2, the electronic device 100 can execute a second component 207 through a first call 211 for selecting, for example, an icon or inputting a voice command in a state in which a component 201 is operating. The first call 211 can generate an explicit call for executing an explicit object. When the explicit call is generated, the second component corresponding to explicit call information can be executed. The explicit call can include a command for executing a target program and execute the target program without a filtering operation 205 of the list recommendation program 203 of the electronic device 100.

As another example, the electronic device 100 can filter out a corresponding list through a second call 213 for selecting, for example, an icon or inputting a voice command in a state where the component 201 is operating. The second call 213 can be an implicit call that does not specify an object. Since an explicit object, such as a program to be executed, does not exist when the implicit call is generated, the electronic device 100 can filter out a list of programs corresponding to object search information of the implicit cal through a database, such as the list recommendation program 114.

The electronic device 100 can obtain programs including the function or identification code of the electronic device 100 corresponding to data, such as the function or identification code of the electronic device 100, included in the object search information of the implicit call and configure a list of programs. The electronic device 100 can display the list of filtered programs by configuring an UI operation on the touchscreen 133 of the electronic device 100 or second electronic device or output the list of filtered programs in a voice manner.

The electronic device 100 can execute a second program through a third call from the displayed list of programs. The third call 215 can be an explicit call that specifies an object. When the explicit call for executing the second component 207 is generated, the third call can execute the second component 207 like the first call 211.

Herein, a first software module can be a unit representing one user interface in the electronic device 100. The electronic device 100 can include a plurality of first software modules in one program. The plurality of first software modules can be executed together in order to form one integrated user interface. The first software modules can operate independently from each other.

A second software module may not configure an UI operation to be displayed on the electronic device 100 and can be a component which can be executed in background. The second software module can perform another operation (music playback through a second program or data processing through a third program) in background while the electronic device 100 executes a specific operation (first program). In addition, when another operation is performed, a result thereof can be provided to the first software module.

In an embodiment, when the electronic device 100 plays back music through the first program, the second program can provide one or a plurality of first software modules for selecting a music for playback and performing, for example, playback, rewind, playback of next media. However, the electronic device 100 continues to play back music during the execution of the first program even though display for the second program is not provided. When the second program is executed, a new thread can be generated. The generated thread can be in charge of playing back music and can operate in background even when performing another operation besides the second program.

The third software module can be a software module for performing an operation of receiving or responding to a broadcast rather than performing an active operation in the electronic device 100. The third software module can receive or respond to a broadcast that can be generated in system codes or programs, such as low battery notification, text message reception, and music playback. A program can include a plurality of third software modules that respond to a plurality of broadcasts.

The electronic device 100 may not output a user interface even though configuring the user interface. The electronic device 100 can execute a program or software module for responding to received information and display the response using various methods, such as sound and vibration.

A fourth software module can perform an operation for generating, for example, data in a program in the electronic device 100. The generated data can be data configuring the database of the electronic device 100. In addition, the fourth software module can provide controllable data to another program for use. The electronic device 100 can include address book data. The first program can be Social Network Service (SNS) that is provided with an address book and can transmit and receive a text message to and from the second electronic device. The fourth software module can provide the address book data including information about an object for communicating with the second electronic device through the first program to the first program.

The software modules of the above-described embodiments can be an activity component, a service component, a broadcast receiver component, and a contents provider in a case where OS is android.

For example, the components illustrated in FIG. 2 can be a program that is running in the electronic device 100, a background service, or an UI operation displayed on the electronic device 100, such as a program.

Various embodiments of the present disclosure are provided under assumption that the operating system (OS) of the electronic device 100 is android. The present disclosure is not limited to the electronic device 100 whose the OS is android and can be applicable to the electronic device including another OS.

Figure 3A:
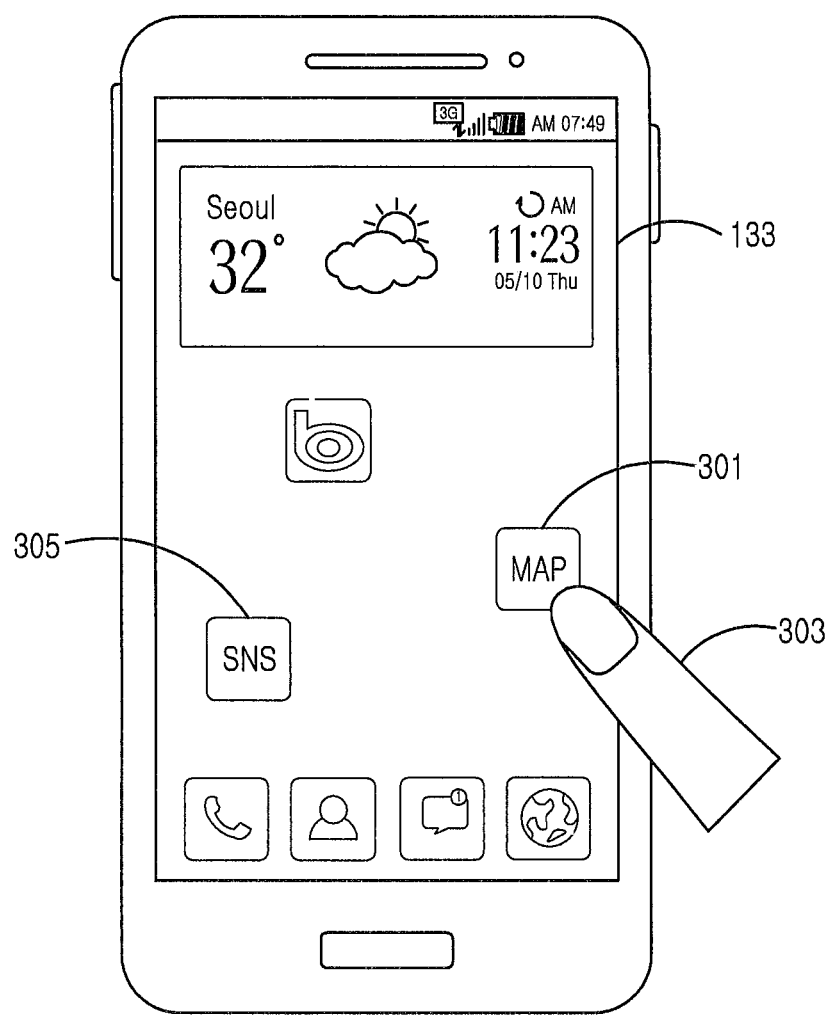
FIGS. 3A and 3B are diagrams illustrating operations of an implicit call in an electronic device according to the embodiment of FIG. 1.
Figure 3B:
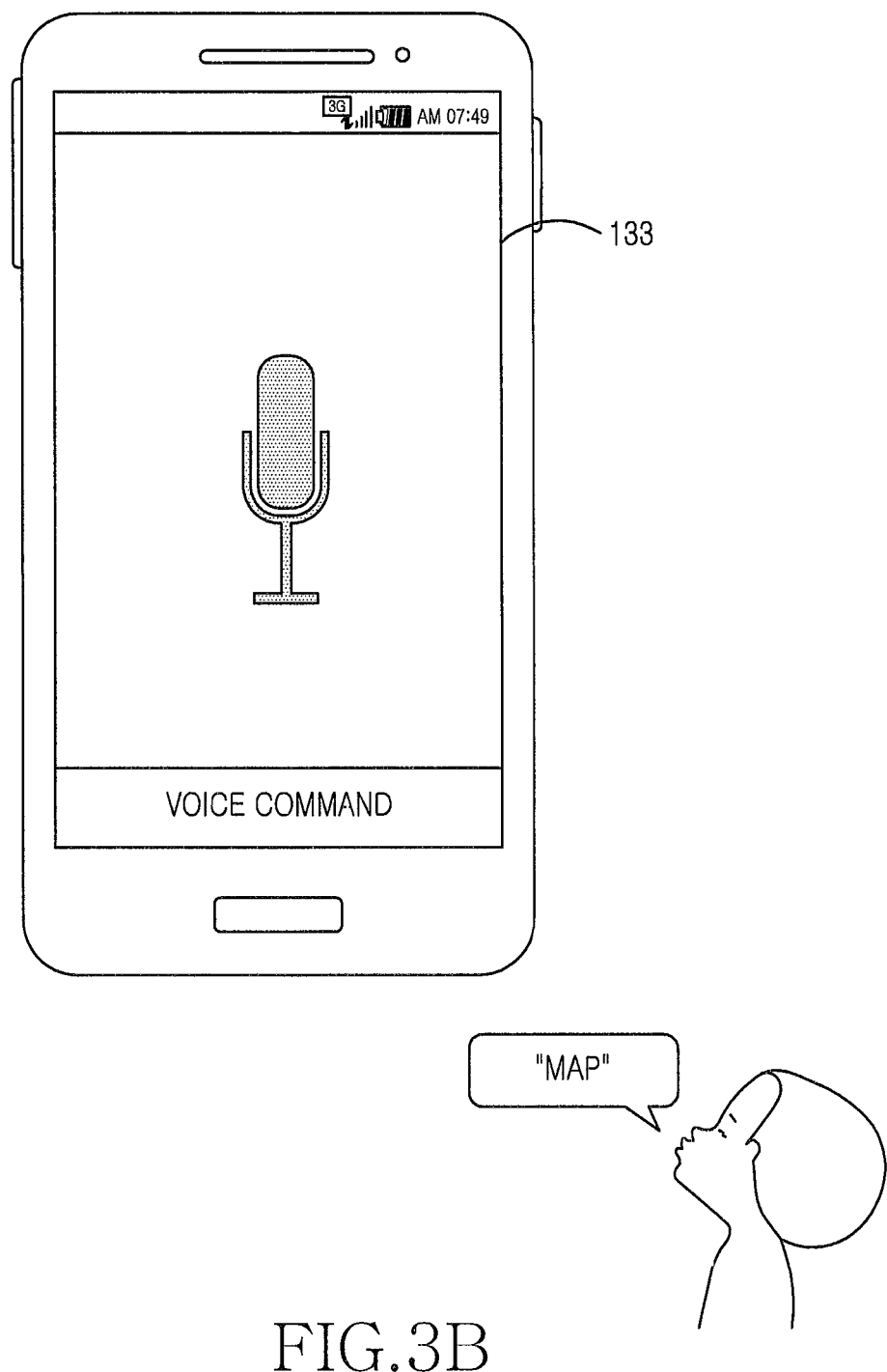

FIGS. 3A and 3B illustrate operations of an implicit call in an electronic device according to embodiments of the present disclosure. The electronic device 100 can generate an implicit call and an explicit call through various methods. The electronic device 100 can select an icon, view or widget that includes a command for generating an implicit call or explicit call as an operation for executing a second program when executing the second program during running of a first program for displaying an activity, such as view or widget, or a component.

As illustrated in FIG. 3A, when the electronic device 100 is executing the first program, an UI object 301, such as an icon, view, or widget for generating a call associated with a map can be selected through a touch 303 in a configuration of UI operations displayed on the touchscreen 133.

When the UI object 301 is an explicit call including a command for executing an explicitly defined object, a corresponding map program can be executed.

On the contrary, when the UI object 301 is an implicit call that does not specify a target program to be executed, map programs corresponding to information can be filtered out from a database, such as the list recommendation program 114, based on information included in the implicit call or the selected UI object(s), such as an icon, view or widget, and a list of obtained programs can be displayed on the touchscreen 133. One UI object can be selected in the list of map programs, and the electronic device 100 can execute a map program corresponding to a call included in the selected UT object. The list of program that is filtered out based on object search information of the implicit call in the electronic device 100 can be a component for generating an explicit call.

As illustrated in FIG. 3B, when the electronic device 100 is executing the first program, a call associated with a map can be generated by inputting a voice command through a microphone 142.

When the voice command is an explicit call including a command for executing an explicit object, a corresponding map program can be executed.

On the contrary, when the voice command is an implicit call that does not specify a target program to be executed, map programs corresponding to information can be filtered out from a database, such as the list recommendation program 114, based on information included in the implicit call or the input voice command and a list of obtained programs can be output in a voice manner through the speaker 141. In addition, the electronic device 100 can display a list of obtained programs through UI objects along with voice output 411.

The electronic device 100 can select one UI object from the displayed list of programs or receive a voice command. When an input voice command "2D (2 Dimension) map" is an explicit call for executing a 2D map program, a corresponding 2D map program can be executed.

Figure 4A:
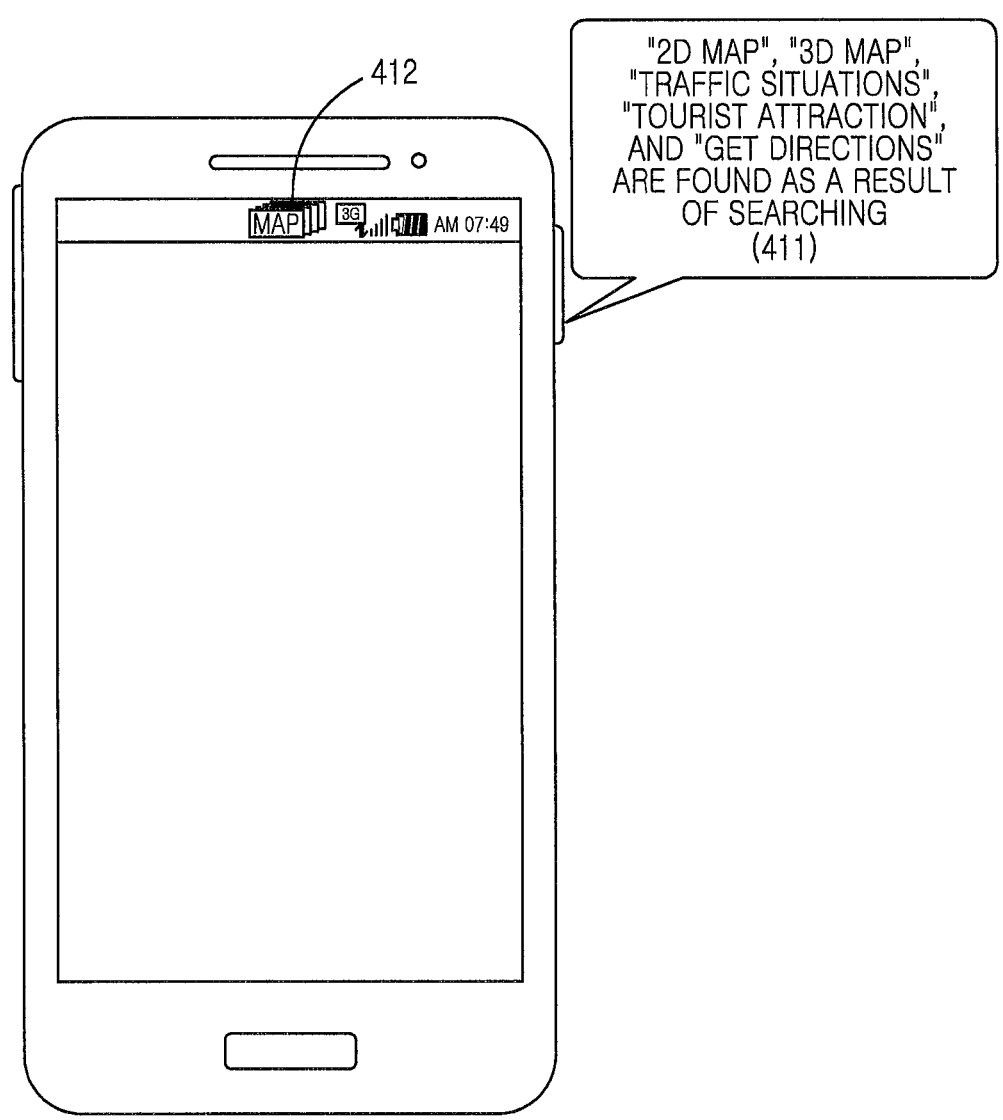
FIGS. 4A and 4B are diagrams illustrating operations of an implicit call in an electronic device according to the embodiment of FIG. 1.
Figure 4B:
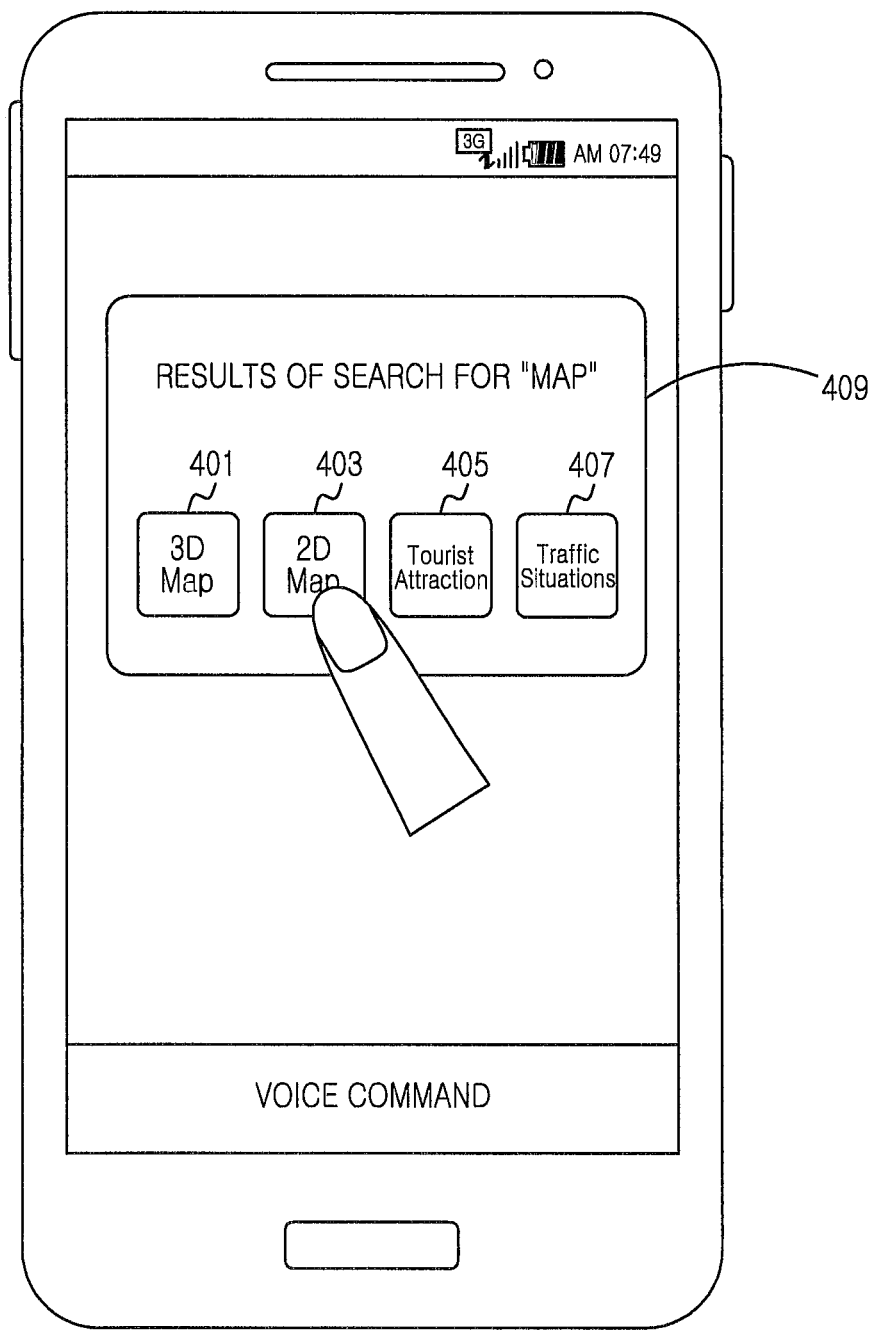

FIGS. 4A and 4B illustrate operation of an implicit call in an electronic device illustrated in FIG. 1 according to embodiments of the present disclosure. Referring to FIG. 4A, the electronic device 100 can output a list of programs, which are filtered out based on object search information of the implicit call, in a voice manner. When a selected (303) map icon 301 in FIG. 3B or an input voice command in FIG. 3B is an implicit call, a database can be searched based on the object search information of a "map" command (under a condition of "using map"), programs satisfying the condition can be filtered out, and "2D map", "3D map", "traffic situations", "tourist attraction", and "get directions" programs which use a map can be filtered out. The electronic device 100 can display a list of programs which are filtered out in a voice manner as indicated by reference numeral 411 in FIG. 4A.

Referring to FIG. 4B, the electronic device 100 can display the list of programs, which are filtered out based on implicit call information, for example, in a pop-up window, on the touchscreen 133 of the electronic device 100. When a selected 303 map icon 301 in FIG. 3B or an input voice command in FIG. 3B is an implicit call, a database can be searched based on the object search information of a "map" command (under a condition of "using map"), programs satisfying the condition can be filtered out, and "2D map", "3D map", "traffic situations", and "tourist attraction" programs which use a map can be filtered out. The electronic device 100 can display the list of filtered programs on a pop-up window as indicated by reference numeral 409 in FIG. 4B.

Figure 5A:
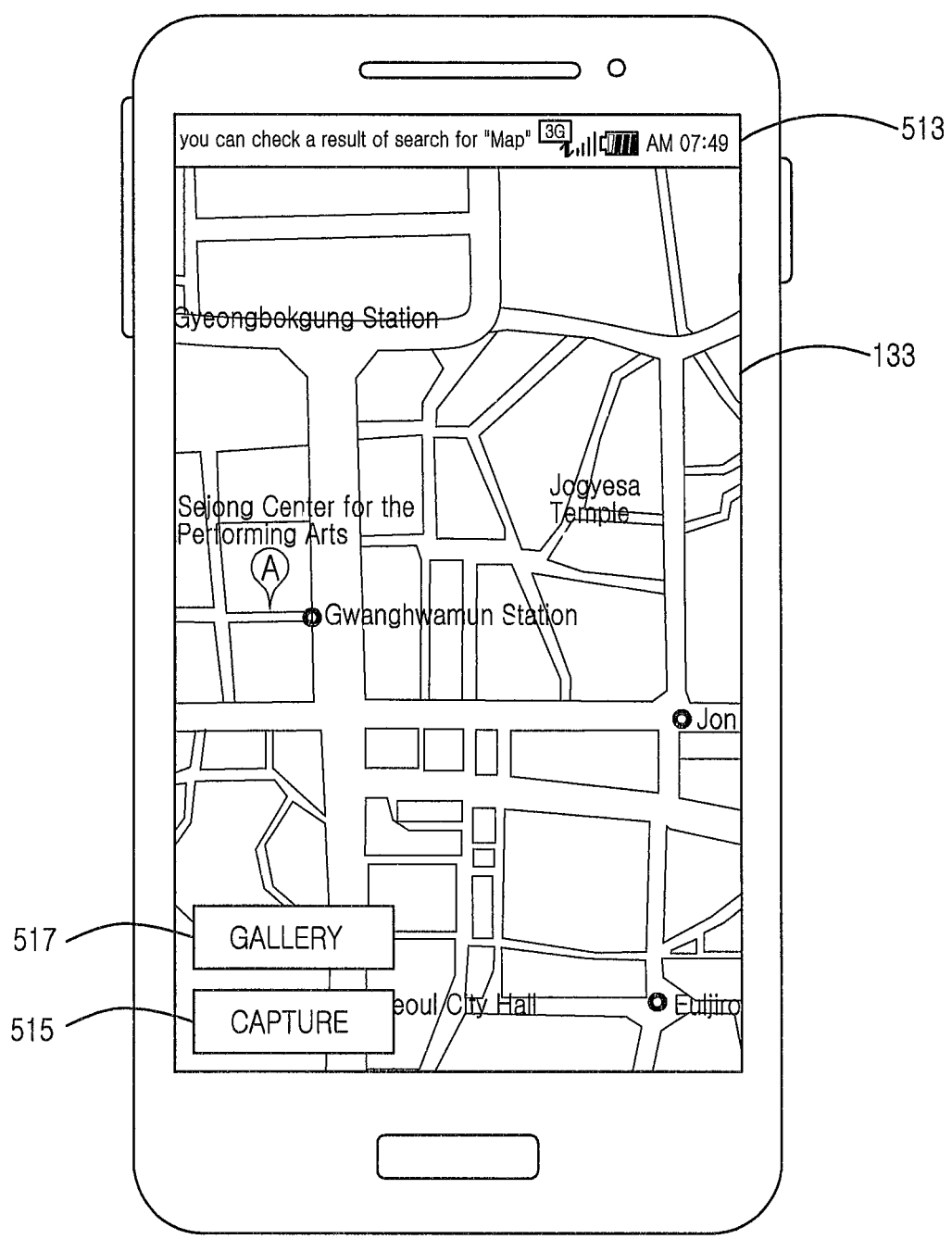
FIGS. 5A and 5B are diagrams illustrating configurations of UI operations according to the embodiment of FIG. 1.
Figure 5B:
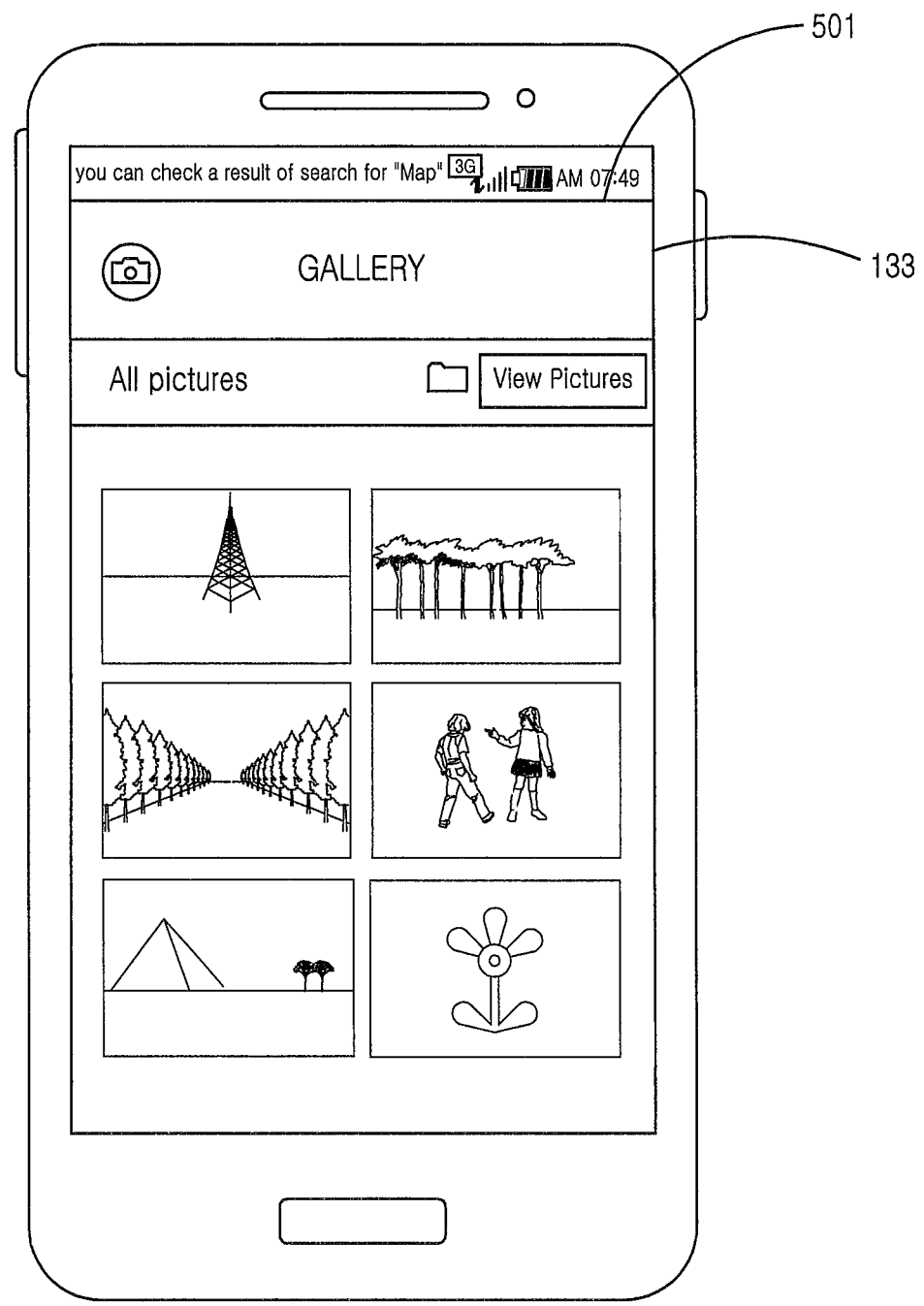

FIGS. 5A and 5B illustrate a configuration of an user interface (UI) operation in an electronic device according to embodiments of the present disclosure. Referring to FIG. 5A, the electronic device is executing a map program (or a program different from the map program) launched through an implicit call and displays an notification 513 that a list of programs which are filtered out based on object search information of the implicit call associated with the map program is checkable on the touchscreen 113 that displays the UI operation of the map program.

In addition, the electronic device 100 can display an UI object (an icon or a text including a link) including a command for executing another program on a predetermined area of the touchscreen 133 that displays the map program which is being executed. When "GALLERY" 517 or "CAPTURE" 515 in FIG. 5A that is an UI object can be configured by an explicit call or an implicit call and the content of the UI object represents the implicit call, the electronic device 100 can obtain one or more programs corresponding to object search information of the implicit call from a database of a memory 110. As another example, when the content of the UI object represents the explicit call, the electronic device 100 can execute a program corresponding to "GALLERY" 517 and a command corresponding to "CAPTURE" 515.

Referring to FIG. 5B, the electronic device 100 can execute one program (for example, a map program 501 in FIG. 5B) through an implicit call. In a state where the executed program is not terminated, the electronic device 100 can execute the "GALLERY" program and display a notification 501 that a list of programs (for example, a list of programs obtained by filtering a database with a command associated with a map) which are filtered out based on object search information of the implicit call is checkable on the touchscreen 133 on which an UI operation of the executed "GALLERY" program is being displayed.

A configuration of an executed UI operation of the map program according to an icon, view, or widget that can include a command for executing a program or a command for executing the map program that can be included in a call of a voice command can be displayed.

When the map program is selected from the list of programs obtained by filtering the database through the implicit call and is executed, the notification 501 that the list of programs obtained through the implicit call is checkable can be displayed in a state where the map program is running.

The electronic device 100 can store data about the list of programs obtained through the implicit call in the memory 110 of the electronic device 100. The stored data can be maintained in an active state in the memory 110 of the electronic device 100. The stored data can be displayed on the electronic device 100 by performing a reference operation until a reference condition is satisfied and may not be then displayed.

For example, when a map icon 301 in FIG. 3A is an implicit call, the electronic device 100 can obtain a list of programs corresponding to information included in data of the implicit call from a database stored in the memory 110 through a list recommendation program 114. The electronic device 100 can display the obtained list of programs as indicated by reference numeral 409 of FIG. 4B by configuring an UI operation on the touchscreen 133 of the electronic device 100 or can output the obtained list of programs through the speaker 141 in a voice manner as indicated by reference numeral 411 of FIG. 4A. The electronic device 100 can detect an operation (selection of an UI object or voice input) for selecting one program from the displayed list of programs and execute the corresponding map program through an explicit call included in the operation.

Herein, the reference operation can include one or more of an operation of touching an UI object on the touchscreen 133 of the electronic device 100, an operation of touching, dragging, and releasing an UI object, an operation of touching an UI object multiple times, an operation through hovering, an operation through eye and/or iris recognition, an operation through thought recognition, an operation through button click, and an operation for making a predetermined motion through the electronic device 100. In the following description, the reference operation can include the above-described examples of the reference operation.

The electronic device 100 can display the notification 501 informing that the list of filtered programs is checkable on the touchscreen on which the UI operation of the map program is being displayed. The notification can be displayed using a notification bar as indicated by reference numeral 501 of FIG. 5A, a notification window (can be displayed by performing the reference operation) as indicated by reference numeral 409 of FIG. 4B, a voice output as indicated by reference numeral 411 of FIG. 4A, or a pop-up message (409 in FIG. 4B). The content of the notification can be displayed in a text form as indicated by reference numeral 501 of FIG. 5A, in a form including an image as indicated by reference numeral 409 of FIG. 4B, or in a form of displaying an icon in the notification bar as indicated by reference numeral 412 of FIG. 4A, or can be output in a voice manner as indicated by reference numeral 411 of FIG. 4A. At the time of checking the contents of the notification bar (501 of FIG. 5A) by touching or dragging the notification bar, the electronic device 100 can display the programs which are filtered out.

The map program can display second programs adapted to interwork with the program on the touchscreen 133 on which the UI operation of the map program is being displayed, or can output the second programs in a voice manner.

For example, referring to FIG. 5A, a "CAPTURE" icon 515 for capturing the UI operation of the map program or a "GALLERY" icon 517 for launching a "GALLERY" program for allowing a user to see still pictures, such as captured photographs, or moving pictures can be displayed as the second programs adapted to interwork with the map program on the touchscreen 133 on which the map program is being displayed. The "CAPTURE" icon 515 or "GALLERY" icon 517 displayed on the map program can be an explicit call or implicit call.

The electronic device 100 can execute a "GALLERY" program by selecting the "GALLERY" icon 517 displayed on the map program. When a command that configures the "GALLERY" icon 517 is an explicit call, the corresponding "GALLERY" program can be executed.

The electronic device 100 can execute the "GALLERY" program through the explicit call and display the notification 501 informing that a list of filtered programs is checkable on the touchscreen 133 on which the operation of the "GALLERY" program is being displayed. The notification 501 can be displayed using a notification bar 501 as illustrated in FIG. 5B, a notification window (can be displayed by performing a reference operation) as indicated by reference numeral 409 of FIG. 4B, or can be output in a voice manner as indicated by reference numeral 411 of FIG. 4A. At the time of checking the contents of the notification bar (501 of FIG. 5A) by touching or dragging the notification bar, the electronic device 100 can display the programs which are filtered out.

The electronic device 100 can execute the "GALLERY" program through the "GALLERY" icon 517 displayed by the map program while not terminating the map program launched from a list of programs initially filtered out through an implicit call. The electronic device 100 can store the list of programs from which the map program that is not terminated has been selected in the memory 110 and display the notification to allow a user to perform checking in the "GALLERY" program executed to interwork with the map program. The data of the notification 501 which the electronic device 100 displays on the touchscreen 133 on which the UI operation of the "GALLERY" program is displayed can be identical to that of the notification 501 of FIG. 5A displayed in the map program that displays the "GALLERY" icon 517 for executing the "GALLERY" program. The electronic device 100 can display the list of programs which are filtered out based on information included in the implicit call by touching or dragging the notification 501 displayed on the touchscreen. In addition to the method for displaying the list of programs using the notification bar, the list of program can be displayed through a method for displaying the list on a notification window (for example, a pop-up window displayed on the touchscreen on which an operation of the electronic device is being displayed in a pop-up manner) as indicated by reference numeral 409 of FIG. 4B by performing a reference operation.

Figure 6:
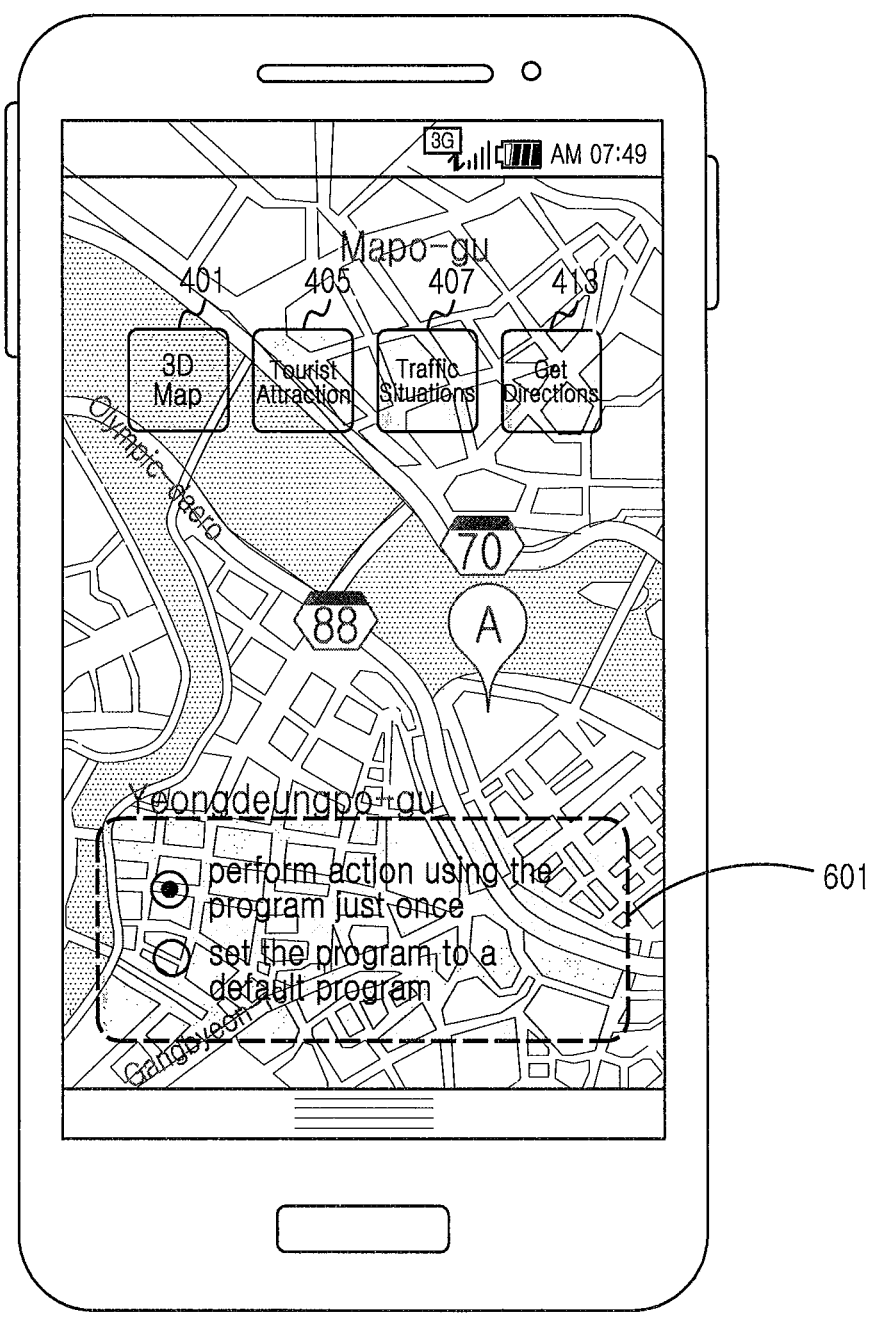
FIG. 6 is a diagram illustrating a configuration of an UI operation according to embodiments of the present disclosure.

FIG. 6 illustrates a configuration of an UI operation according to data processing in an electronic device according to embodiments of the present disclosure. Referring to FIG. 6, the electronic device 100 can display a list of programs which are filtered out based on object search information of an implicit call on the touchscreen 133 of the electronic device 100 or output the list in a voice manner, and select and execute one program of the displayed programs. The electronic device 100 can display a notification 403 or 501 informing that the filtered programs are checkable in the form of a notification bar on the touchscreen 133 of the electronic device in which a program is running as indicated by reference numeral 403 of FIG. 5A or reference numeral 501 of FIG. 5B. The electronic device 100 can allow a user to check the filtered programs by a method for touching or dragging the notification as illustrated in FIG. 6.

The electronic device 100 selects one program from a list of programs filtered out based on the object search information of the implicit call and sets the program to a default program. When the default programs is determined, the implicit call can include an explicit object to be executed and acts as an explicit call. The electronic device 100 can display, for example through a pop-up window, a selection menu for determining whether to set one selected program as a default program on the touchscreen 133 which the filtered programs are being displayed on as indicated by reference numeral 601 in FIG. 6.

Figure 7A:
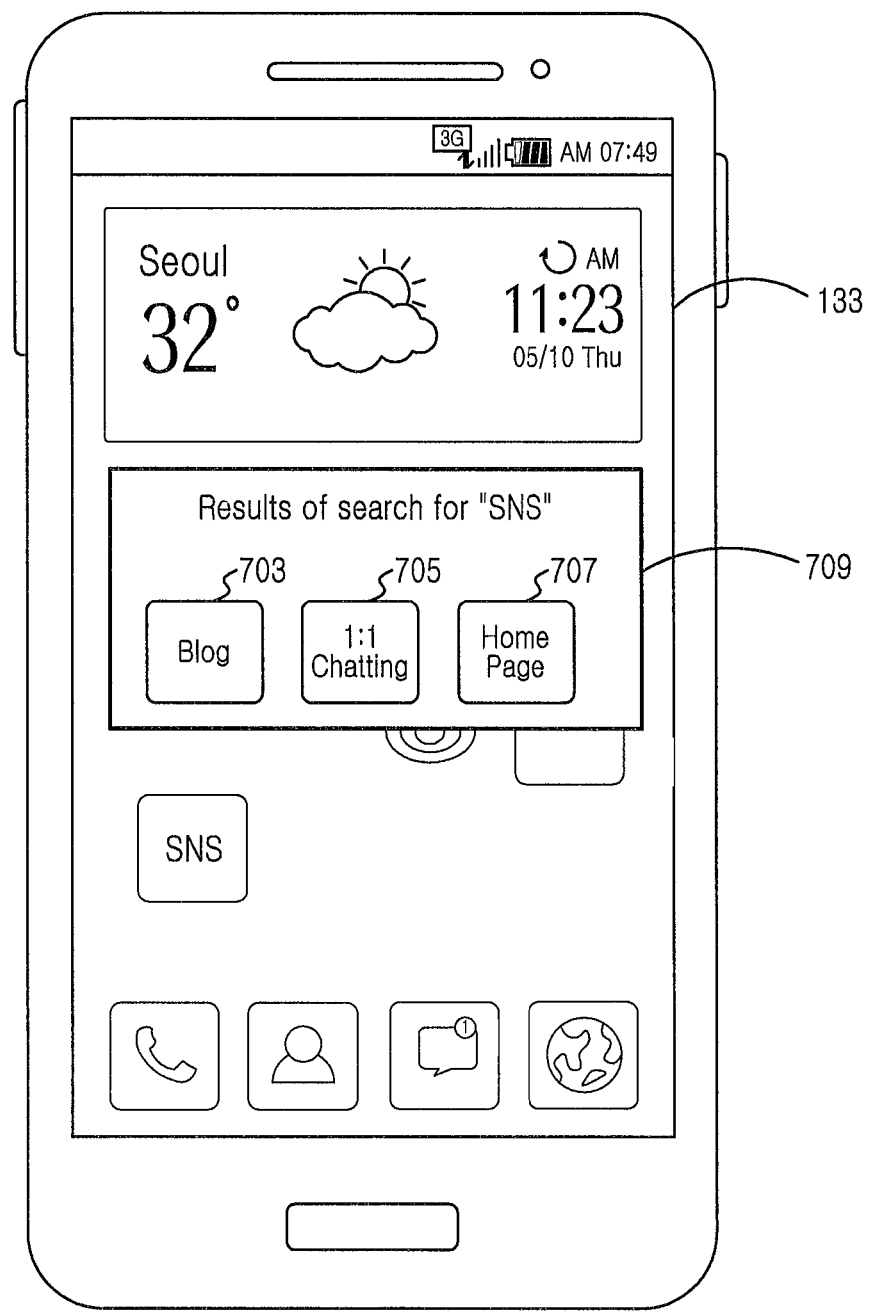
FIGS. 7A to 7E are diagrams illustrating configurations of UI operations according to processing of an implicit call in an electronic device according to embodiments of the present disclosure.

FIGS. 7A to 7E illustrate configurations of an UI operation according to an implicit call in an electronic device according to embodiments of the present disclosure. Referring to FIG. 7A, the electronic device 100 can generate an implicit call when a "SNS" icon (305 of FIG. 3A) is selected, search for or filter out programs corresponding to object search information of the "SNS" icon (305 of FIG. 3A) from a database of the electronic device 100, and display a list of filtered programs on the touchscreen 133 of the electronic device as indicated by reference numeral 707 of FIG. 7A or output the list through a speaker 141 in a voice manner.

Figure 7B:
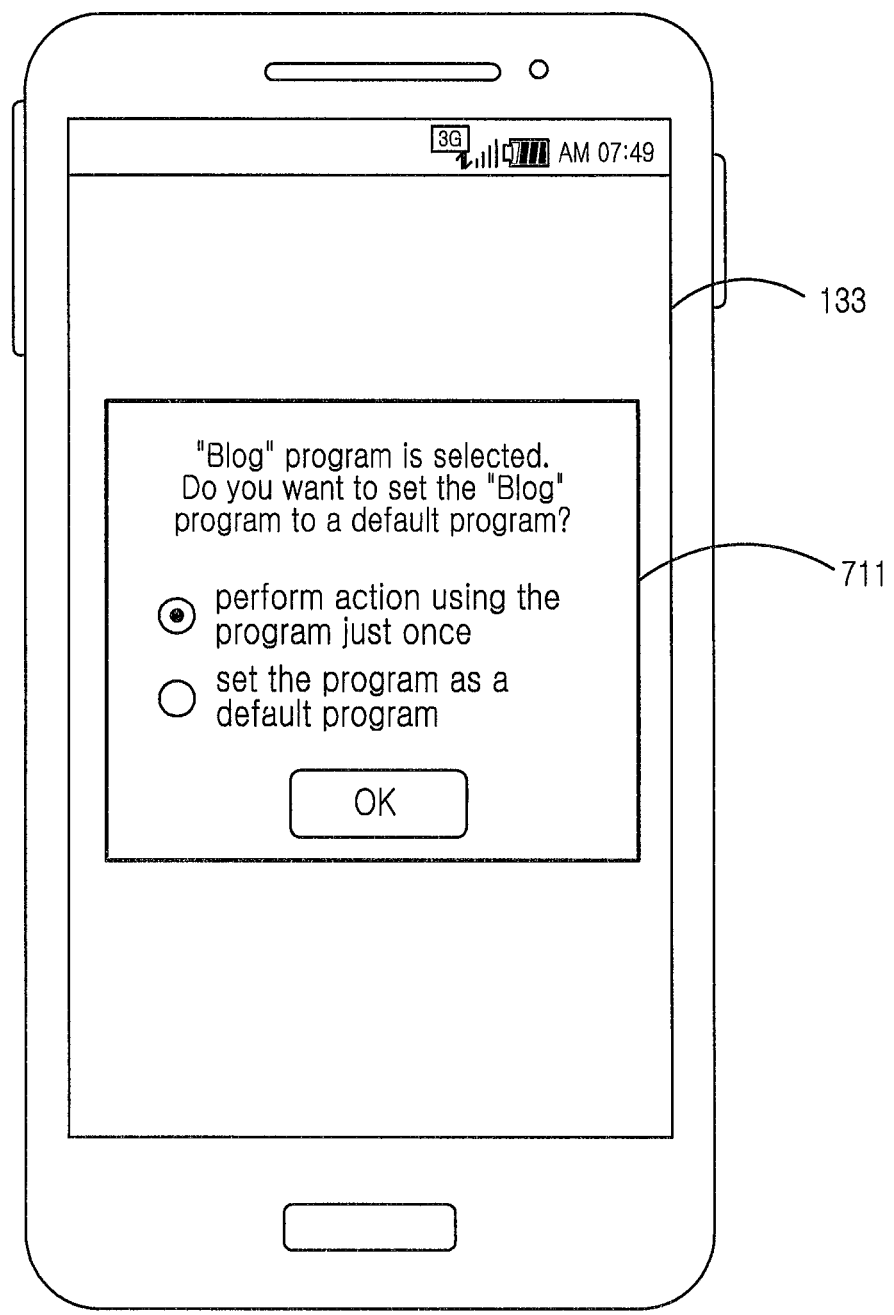

Referring to FIG. 7B, the electronic device 100 can select one program from the displayed list of filtered programs and execute the selected program. The electronic device 100 can display the list of filtered programs on a pop-up window 709 in FIG. 7A and select one program (for example, a blog program) from the displayed programs. When the blog program 703 is selected, the electronic device 100 can display a menu 711 for inputting whether to set the selected blog program to a default program.

When "perform action using the program just once" is selected in the menu 711, the electronic device 100 may not set the blog program 703 to a default program of the implicit call associated with the "SNS" icon 305, and electronic device 100 can call the blog program. When the "SNS" icon 305 of FIG. 3A is selected, the electronic device 100 may not include an explicit target program in the implicit call, and can display a list of programs obtained by searching or filtering the database of the electronic device 100 based on object search information of the implicit call included in the "SNS" icon 305 as indicated by reference numeral 709 of FIG. 7A.

Figure 7C:
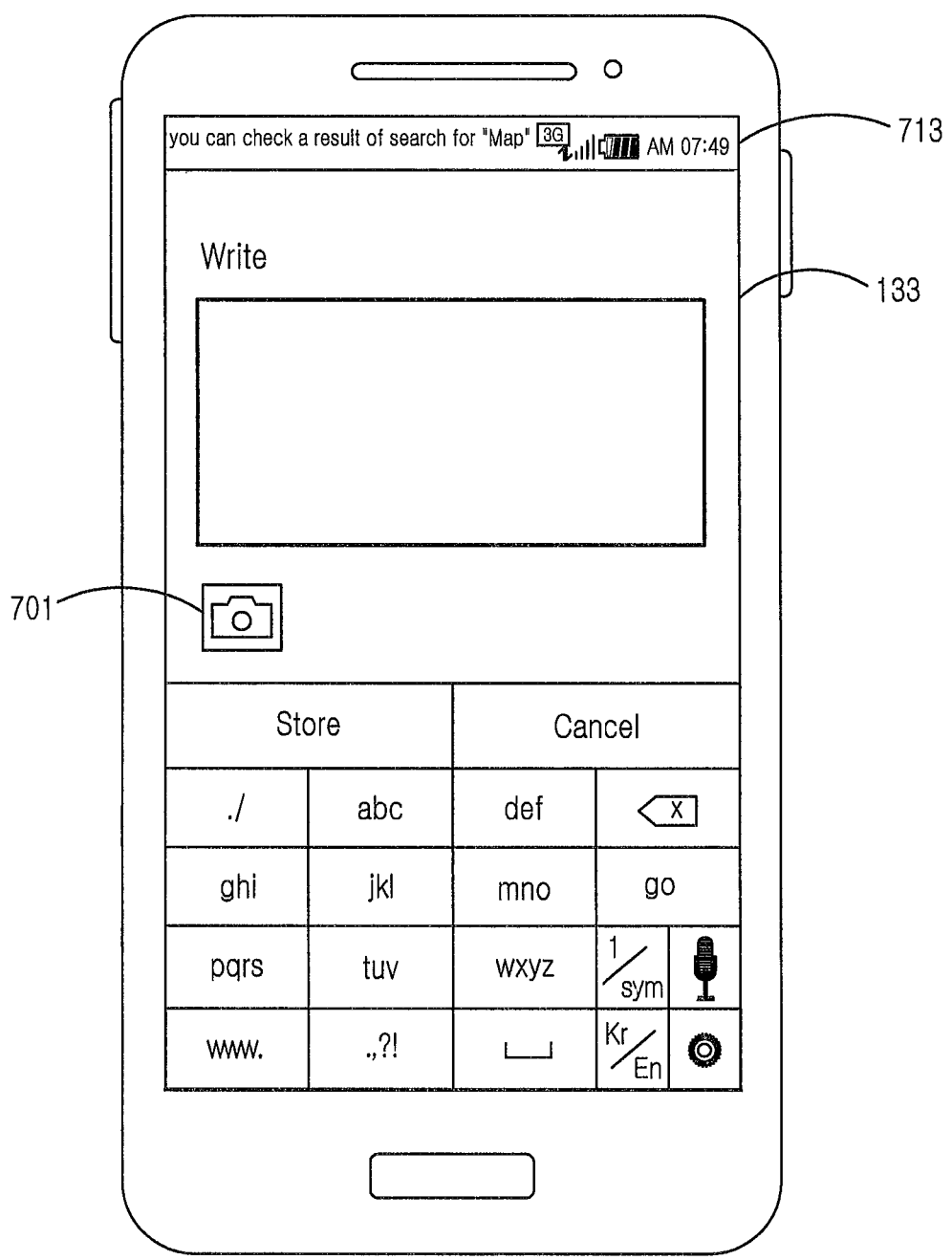

When "set the program to a default program" is selected in the menu 711, the electronic device 100 can set the blog program 703 to a default program with respect to the implicit call associated with the "SNS" icon 305. When the "SNS" icon 305 of FIG. 3A is selected, the electronic device 100 can include an explicit target program (for example, the blog program set as the default program) in the implicit call, and can execute the blog program 703 as illustrated in FIG. 7C, without displaying a list of programs obtained by searching or filtering the database of the electronic device 100 based on object search information of the implicit call included in the "SNS" icon 305 as indicated by reference numeral 709 of FIG. 7A. The "SNS" icon (305 of FIG. 3A) with respect to which the blog program 703 is set as the default program can act as an explicit call for executing the blog program 703.

Referring to FIG. 7C, the electronic device 100 can display an notification 713 informing that a list of filtered programs, obtained by searching or filtering the database of the electronic device 100 according to the implicit call generated in FIG. 7A, is checkable on the touchscreen 133 on which the operation of the blog program launched through FIG. 7B is being displayed. The electronic device 100 can display the list of filtered programs, and select and execute one program. The electronic device 100 can store the list of filtered programs without deleting the list, and display the list of filtered programs on the touchscreen 133 of the electronic device through a reference operation during execution of the one selected program.

The electronic device 100 can display an icon 701 or link for executing a second program (for example, a camera capturing program associated with the operation of the blog program) on a screen on which an operation of a launched first program (for example, the blog program) is being displayed. The electronic device 100 can select (715) and execute the camera icon 701 without terminating the blog program.

Figure 7D:
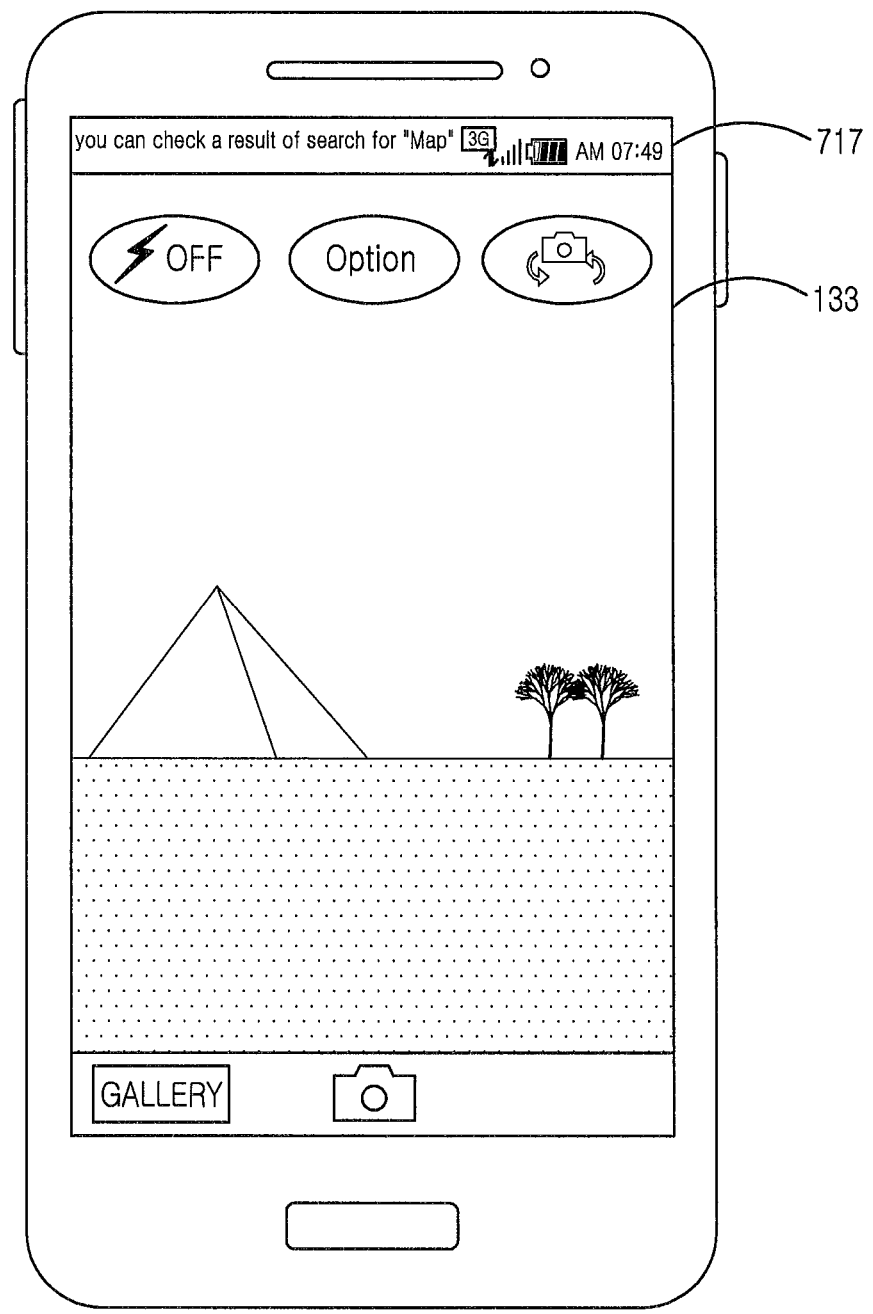

Referring to FIG. 7D, the electronic device 100 can execute a camera program through the camera icon 701 selected in FIG. 7C. When executing the camera program through the camera icon 701 during the operation of the blog program in FIG. 7C, the electronic device 100 can execute the camera program in a state where the operation the blog program is not terminated. The electronic device 100 can store a list of filtered programs, which enable selection of the blog program by generating the implicit call, in the memory 100 until the blog program is terminated, and check the list of the filtered programs by inputting a reference operation to the electronic device 100 which is displaying the operation of the camera program launched by the blog program.

In addition, when there is an input for selecting, for example, the camera icon 701 for executing the camera program, the electronic device 100 can search or filter the database of the electronic device based on pieces of information about the function and purpose, keyword, and ID (Identification) code of the program included in a command for executing the camera program and peripherals of the electronic device 100 which is usable by programs, and obtain a list of relevant programs associated with the camera program. The program include in the list of relevant programs can be a program included in the memory 100 of the electronic device 100, and provide a command, icon, or link for downloading a corresponding program when the program is not included in the memory 110.

The electronic device 100 can display an notification 717 informing that a list of filtered programs or a list of relevant programs is checkable on the touchscreen 133 on which the operation of the camera program is being displayed through a notification bar or notification window or can output the notification 717 in a voice manner.

Figure 7E:
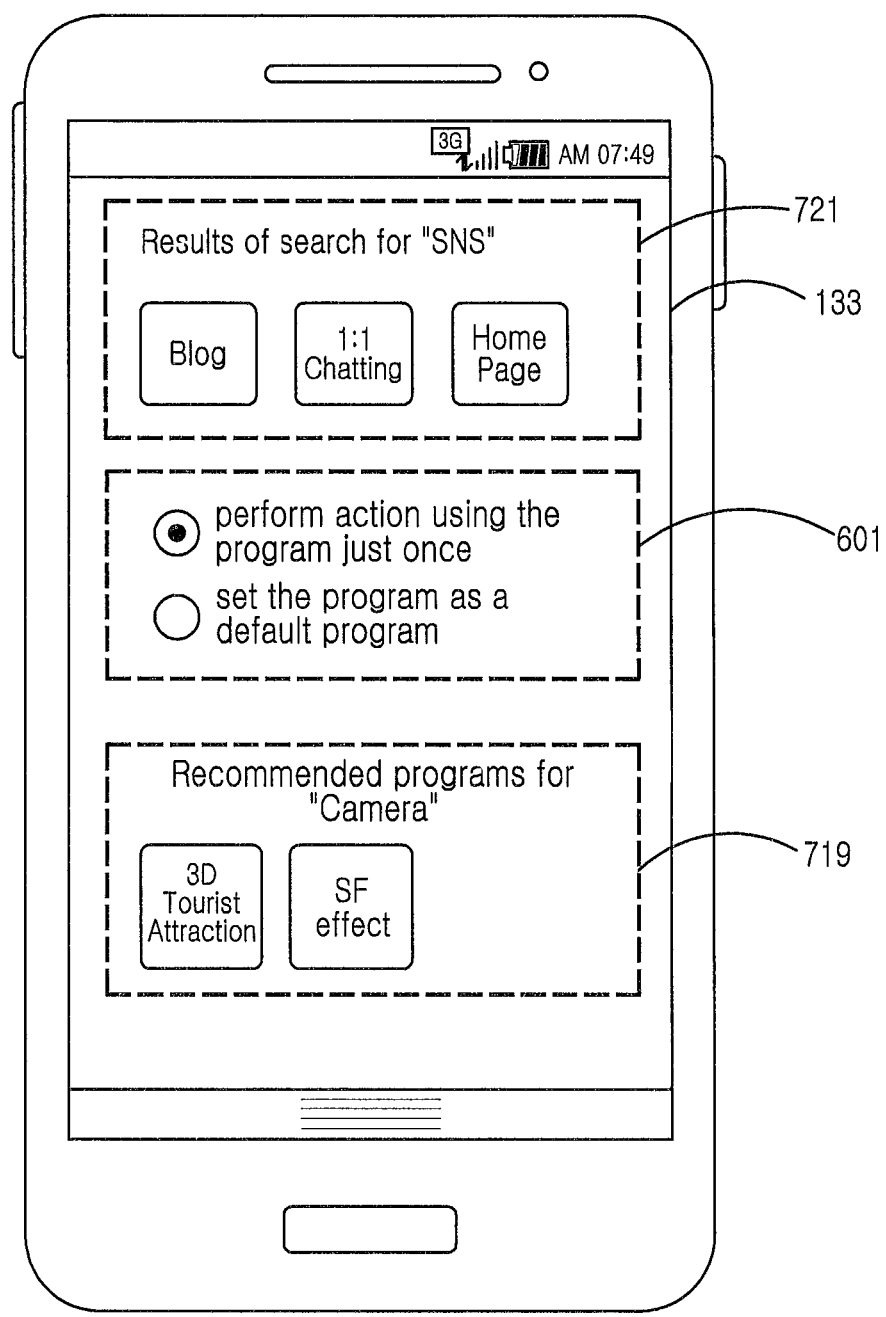

Referring to FIG. 7E, the electronic device 100 can display the UI operation of the camera program and the notification 717 of FIG. 7D on the touchscreen 133 and check the contents thereof the notification 717 by performing a reference operation, for example by touching or dragging the notification 717.

Referring to FIG. 7E, when the notification 717 on the notification bar of FIG. 7D is touched or dragged, the electronic device 100 can display the list 721 of filtered programs, a menu 601 for selecting whether to set one program selected from the list of programs which are filtered out based on object search information of an implicit call to a default program of the implicit call, or a list 719 of relevant programs associated with a camera program launched by a blog program.

Although not illustrated, the electronic device 100 can further provide a menu for releasing a default program with respect to an implicit call.

When the blog program is terminated, the electronic device 100 can add a list of filtered programs to a database or delete the list from the memory 110. When the camera program is terminated, the electronic device 100 can add a list of relevant programs to a database or delete the list from the memory 110.

For example, the electronic device can decide to display or delete data according to conditions, such as whether a predetermined time interval has elapsed after one program is launched through an implicit call, whether a default program is changed, or whether there is a program added to the memory 110 of the electronic device 100 after the database is searched or filtered based on information of the implicit call, in addition to whether the program is terminated.

Figure 8A:
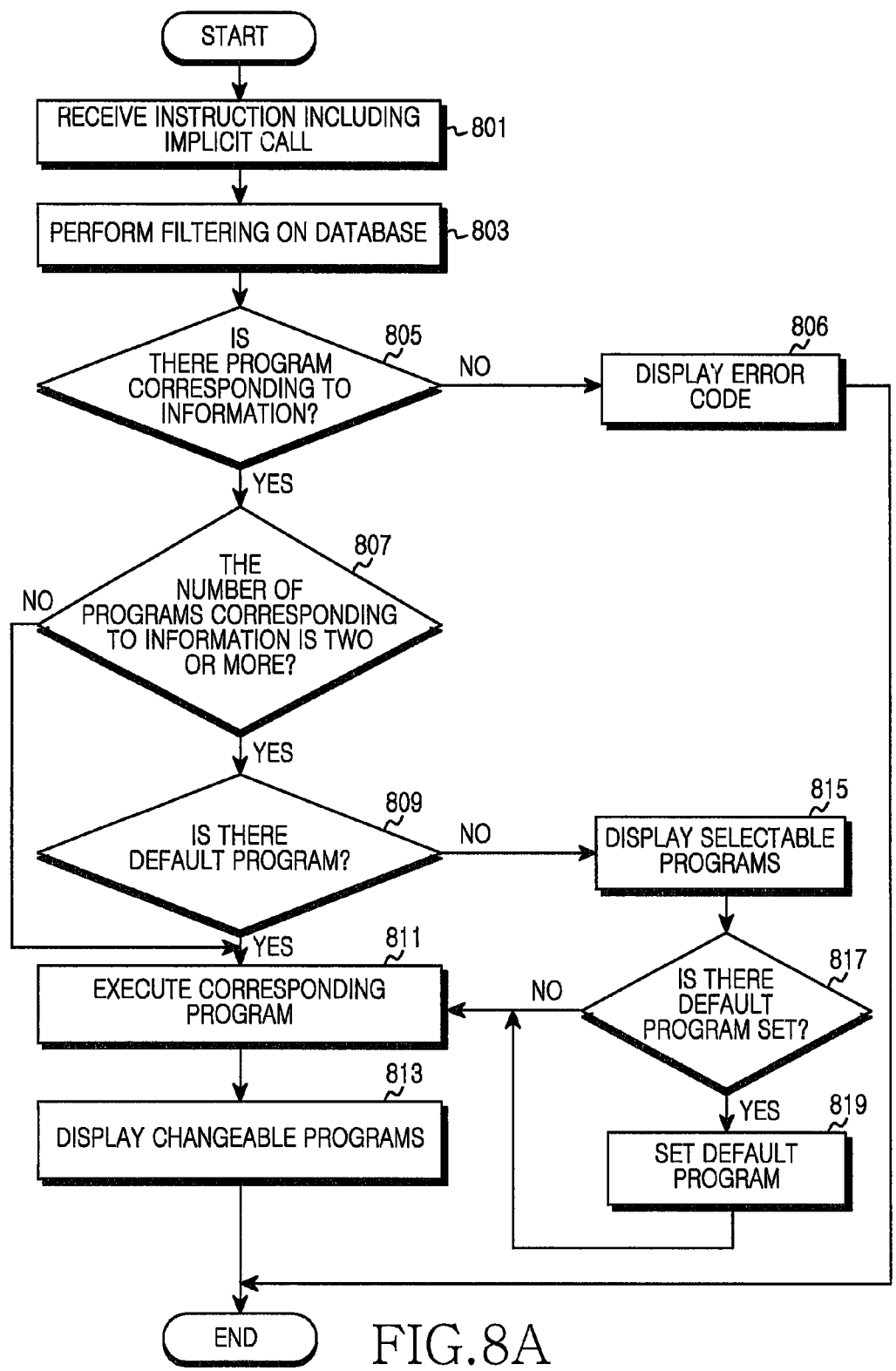
FIGS. 8A and 8B are flowcharts illustrating program operations in an electronic device according to various embodiments of the present disclosure.
Figure 8B:
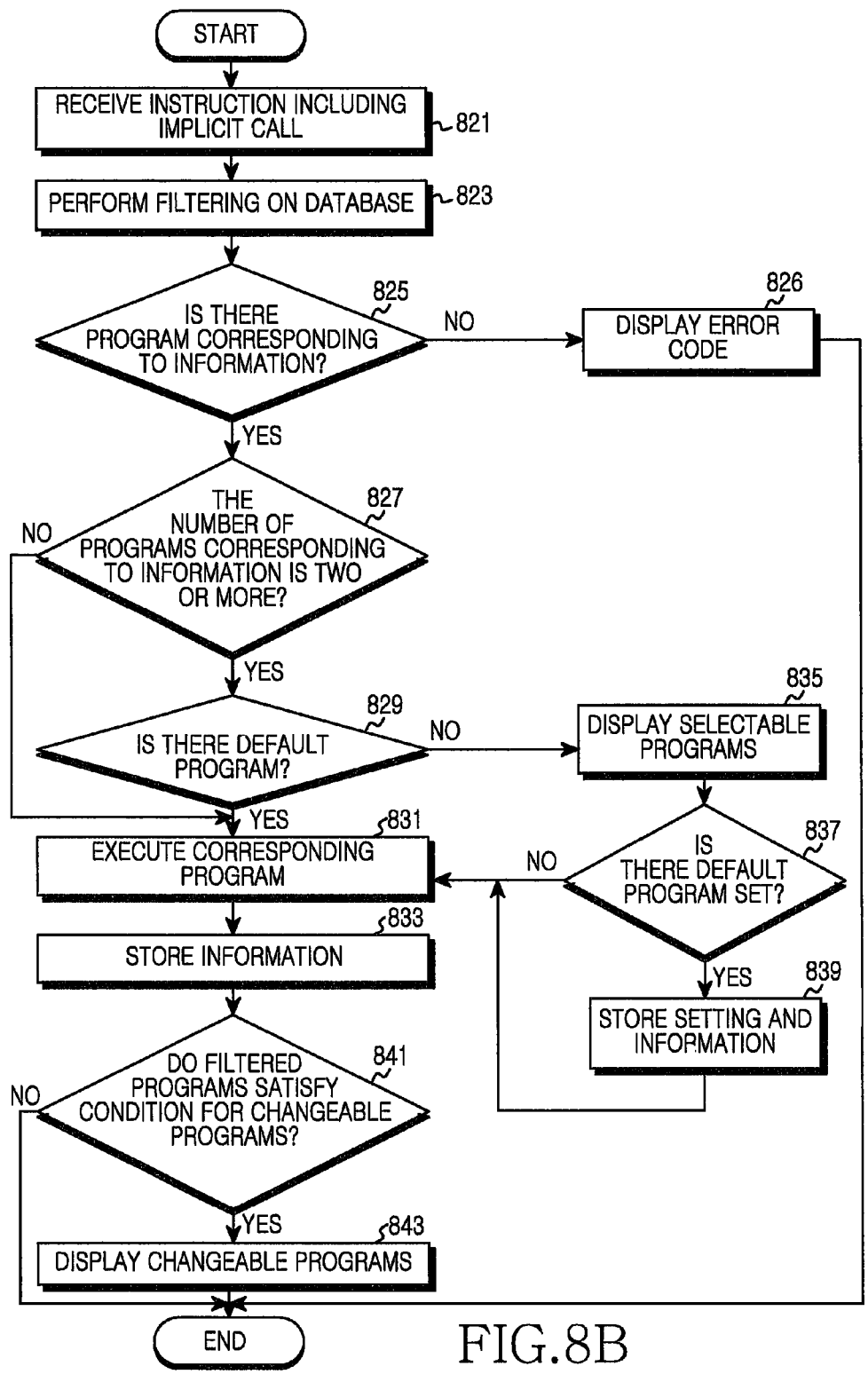

FIGS. 8A and 8B illustrate a detailed flowchart of program operations in an electronic device according to various embodiments of the present disclosure.

Referring to FIG. 8A, the electronic device 100 can generate an implicit call, filter out programs corresponding to object search information of the implicit call from a database of the electronic device 100, and display a list of filtered programs on the electronic device 100. The electronic device 100 can select and execute one first program, set the selected first program to a default program of the implicit call, and display the filtered program through a reference operation by the first program.

In operation 801, the electronic device 100 can select an UI object, such as an icon, including, for example, a call for executing a program which is stored in the memory 110 of the electronic device 100 and is being displayed on the touchscreen 133 of the electronic device 100. When the call included in the selected UI object is an implicit call, the implicit call may not include an explicit target program to be executed in a command. The implicit call can include information about characteristics of a program to be executed. One program or a plurality of executable programs can be determined based on the information. The information can be configured by information about the function and purpose, keyword, and Identification (ID) Code of a program, and peripherals of the electronic device 100 that is usable by the program.

In operation 803, the electronic device 100 can search for or filter out programs corresponding to object search information of the implicit call from the database of the electronic device 100. The database of the electronic device 100 can include pieces of information about functions and purposes, keywords, and ID (Identification) codes of programs installed or stored in the memory of the electronic device 100, and peripherals of the electronic device 100 that are usable by the programs. The pieces of information can be obtained from headers of data, data including program information, or data including information about functions which can be executed by a program package installed in the electronic device 100, or available peripherals of the electronic device 100.

In addition, the electronic device 100 can search or filter Internet or a specific server (for example, a second electronic device) connectable thereto through the communication system 150 of the electronic device 100 at the time of obtaining a program corresponding to the object search information of the implicit call.

In operation 805, the electronic device 100 can determine whether there is a program corresponding to the information by searching or filtering the database based on the object search information of the implicit call.

In operation 806, when there is no program corresponding to the information in the memory of the electronic device, the electronic device 100 can display a result message (or error code) indicating that a program corresponding to the implicit call may not be executed (or may not be found). The electronic device can display the result message on the touchscreen 133 in a display manner or output the message in a voice manner.

In addition, the electronic device 100 can provide a result of a search through a web (Internet or a specific network server) with respect to a program corresponding to the implicit call in addition to the method for displaying the result message (error code) indicating that a program corresponding to the implicit call may not be executed (or may not be found).

In operation 807, the electronic device can determine whether the number of programs obtained as a result of searching or filtering in operation 805 is one or higher. The electronic device can perform operation 811 when the number of the obtained programs is one, and can perform operation 809 when the number of the obtained programs is higher than one.

In operation 809, the electronic device 100 can determine whether a default program is set corresponding to the implicit call, and when the default is set, can determine whether the set default program is included in the programs obtained in operation 803. When the default program is not set corresponding to the implicit call, the electronic device can perform operation 815. When the default program is set, the electronic device can perform operation 811.

In operation 815, the electronic device 100 can display a list of programs that are obtained by searching or filtering the data base in operation 803 on the touchscreen 133, or a second display unit of the electronic device 100 or can output the list through the speaker 141 in a voice manner.

In operation 817, the electronic device 100 can select one program from the list of programs displayed in operation 815, and provide a menu for determining whether to set the selected program to a default program or whether to execute the selected program without setting it to the default program. The electronic device 100 can perform operation 819 when an input for setting the selected one program to a default program is received, and perform operation 811 when an input for executing the selected one program is received, not the input for setting the selected one program to a default program.

In operation 811, the electronic device 100 can execute the selected program. In a case where the selected program is not set to a default program in operation 817, when the implicit call of operation 801 is generated again, a default program may not be set with respect to the implicit call in operation 809, the electronic device 100 can perform operation 815.

When the default program is set corresponding to the implicit call and the default program is included in searched or filtered programs in operation 809, the electronic device 100 may not display the programs filtered out in operation 815 and can execute a program corresponding to the default program. When the default program is set corresponding to the implicit call, the implicit call can be explicitly associated with a target program and act as an explicit call. The electronic device 100 may not proceed to operation 815 from operation 809, can proceed to operation 811, or can execute a set default program.

In operation 813, the electronic device 100 can display a list of programs obtained as a result of searching or filtering in operation 803 or an interface for informing a user of the existence of the list in the state where the program selected in operation 811 is running. The list of programs can be displayed on a notification bar or notification window by a reference operation, for example, by touching or dragging a notification that informs a user that the list of programs is checkable or can be output in a voice manner. The electronic device 100 can execute a program selected through the list or the interface. The electronic device 100 can be provided with information (a method for generating the implicit call and information that is to be delivered to the executed program) about the implicit call.

The electronic device 100 terminates operation 813 to end operations of FIG. 8A.

Referring to FIG. 8A, the electronic device 100 can generate an implicit call, filter out programs corresponding to object search information of the implicit call from a database of the electronic device 100, and display a list of filtered programs on the electronic device 100. The electronic device 100 can select and execute one first program, set the selected first program to a default program of the implicit call, store information about the executed first program, determine whether the filtered programs satisfy a predetermined condition, and display the filtered program through a reference operation by the first program.

In operation 821, the electronic device 100 can select an UI object, such as an icon, including, for example, a call for executing a program which is stored in the memory 110 of the electronic device 100 and is being displayed on the touchscreen 133 of the electronic device 100. When the call included in the selected UI object is an implicit call, the implicit call may not include an explicit target program to be executed in a command. The implicit call can include information about characteristics of a program to be executed. One program or a plurality of executable programs can be determined based on the information. The information can be configured by information about the function and purpose, keyword, and Identification (ID) Code of a program, and peripherals of the electronic device 100 that are usable by the program.

In operation 823, the electronic device 100 can search for or filter out programs corresponding to object search information of the implicit call from the database of the electronic device 100. The database of the electronic device 100 can include pieces of information about functions and purposes, keywords, and ID (Identification) codes of programs installed or stored in the memory of the electronic device 100, and peripherals of the electronic device 100 that are usable by the programs. The pieces of information can be obtained from headers of data, data including program information, or data including information about functions which can be executed by a program package installed in the electronic device 100, or available peripherals of the electronic device 100.

In addition, the electronic device 100 can search or filter Internet or a specific server (for example, a second electronic device) connectable thereto through the communication system 150 of the electronic device 100 at the time of obtaining a program corresponding to the object search information of the implicit call.

In operation 825, the electronic device 100 can determine whether there is a program corresponding to the information by searching or filtering the database based on the object search information of the implicit call.

In operation 826, when there is no program corresponding to the information in the memory of the electronic device, the electronic device 100 can display a result message (or error code) indicating that a program corresponding to the implicit call may not be executed (or may not be found) or a result of a search through a web (Internet or a specific network server) with respect to a program corresponding to the implicit call. The electronic device can display the result message on the touchscreen 133 in a display manner or output the message in a voice manner.

In operation 827, the electronic device can determine whether the number of programs obtained as a result of searching or filtering in operation 825 is one or higher. The electronic device can perform operation 831 when the number of the obtained programs is one, and can perform operation 829 when the number of the obtained programs is higher than one.

In operation 829, the electronic device 100 can determine whether a default program is set corresponding to the implicit call, and when the default is set, can determine whether the set default program is included in the programs obtained in operation 823. When the default program is not set corresponding to the implicit call, the electronic device can perform operation 835. When the default program is set, the electronic device can perform operation 831.

In operation 835, the electronic device 100 can display a list of programs that are obtained by searching or filtering the data base in operation 823 on the touchscreen 133, or a second display unit of the electronic device 100 or can output the list through the speaker 141 in a voice manner.

In operation 837, the electronic device 100 can select one program from the list of programs displayed in operation 835, and provide a menu for determining whether to set the selected program to a default program or whether to execute the selected program without setting it to the default program. The electronic device 100 can perform operation 839 when an input for setting the selected one program to a default program is received, and perform operation 831 when an input for executing the selected one program is received, not the input for setting the selected one program to a default program.

In operation 839, the electronic device can set the selected program to the default program corresponding to the implicit call of operation 821 depending to determination of operation 837. The electronic device 100 can store information about the setting in the memory 110. The information about the setting can be the implicit call selected in operation 821, a list of programs filtered out in operation 823, a number of times which the selected program is set to a default program, and, when the selected program is set to a default program for another implicit call, the other implicit call, or date and time at which the program is set to the default program.

In operation 831, the electronic device 100 can execute the selected program. In a case where the selected program is not set to a default program in operation 837, when the implicit call of operation 821 is generated again, a default program may not be set with respect to the implicit call in operation 829, the electronic device 100 can perform operation 835.

In operation 833, the electronic device 100 can store a result and information resulting from execution of the default program corresponding to the implicit call in the memory 110 according to a result of operation 829. The result or information can include one or more of the implicit call selected in operation 821, the list of programs filtered out in operation 823, a number of times which the program is executed recently (for one week or one month), date and time at which the default program is set, a number of times which an implicit call for executing the default program is selected after the default program has been set, another implicit call when the default programs is set for the other implicit call, and a number of times which the program is executed by an explicit call.

In operation 841, the electronic device 100 can determine whether information stored in the memory 110 or information included in a database of the memory 110 with respect to filtered programs satisfies a condition for displaying changeable programs on the touchscreen of the electronic device 100 or a second display unit.

The electronic device 100 can determine The electronic device 100 can determine one or more of a program which has been recently executed within a predetermined period among the programs which are filtered out according to the condition, a program after a predetermined time interval has elapsed after setting to a default program, a program which had been set to a default program of the implicit call among the filtered programs, a program which is set to a default program of another implicit call among the filtered programs, a program which is recently installed within a predetermined period among the filtered programs, a program which is downloaded more than a predetermined number of download times among the filtered programs, a program which satisfies a predetermined score in Internet or a specific server among the filtered programs, and a program provided for a promotion in Internet or a specific server among the filtered programs.

In operation 843, the electronic device 100 can determine a program satisfying the condition among the programs filtered out in operation 841 and display the program. The displayed program can be displayed on a notification bar or a notification window or be output in a voice manner through a gesture or motion, such as a method of touching or dragging a text or an icon, indicating that a list of programs can be checkable, on the notification bar, or clicking a button.

The electronic device 100 ends operation 843 to terminate operations of FIG. 8A.

Figure 9:
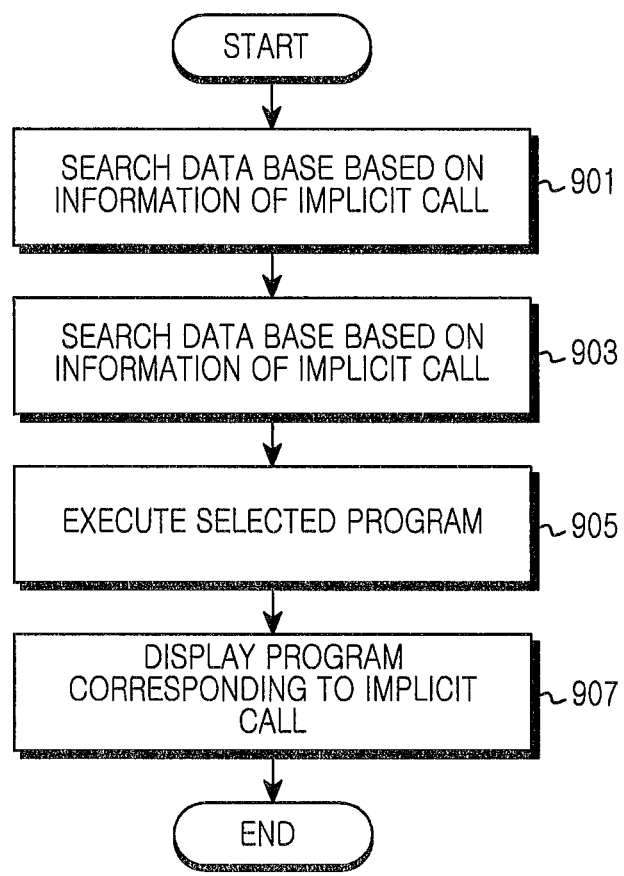
FIG. 9 is a flowchart illustrating program operations in an electronic device according to various embodiment of the present disclosure.

FIG. 9 illustrates a flowchart of program operations in an electronic device according to various embodiments of the present disclosure. Referring to FIG. 9, the electronic device 100 can obtain object search information of an implicit call, search for programs corresponding to the object search information of the implicit call from a database, and display the searched programs on the electronic device 100. The electronic device 100 can select and execute a program of the displayed programs, and display the programs searched from the database on a screen on which the operation of the selected programs is being displayed.

In operation 901, the electronic device 100 can generate a call by selecting an UI object, such as an icon, displayed on the touchscreen 133.

The call can be an explicit call that specifies an object to be executed in a command or a implicit call that does not specify an object to be executed and include conditions for an object.

The conditions for an object included in the implicit call can be characteristics of a program, such as a function, purpose, keyword, and Identification (ID) Code of a program, and information peripherals of the electronic device 100 that can be used by the program.

The electronic device can perform comparison with programs stored in the memory 110 of the electronic device 100 using information obtained from the generated implicit call and obtain a list of programs corresponding to the information.

The electronic device 100 can search for or filter out programs stored in the memory of the electronic device 100 based on the information obtained in operation 901. The electronic device 100 can establish a database using information about programs in the memory 110 and obtain a list of programs corresponding to the information by searching or filtering the database based on the search information (command or code of search conditions) obtained from the implicit call.

In operation 903, the electronic device 100 can display the obtained list of programs on the touchscreen 133 of the electronic device 100 or output the list in a voice manner through the speaker 141. When the list is displayed on the touchscreen 133, the electronic device 100 can display the list of programs by configuring an UI object, such as an icon or link, including commands for executing respective programs included in the obtained programs.

For example, the electronic device 100 can output the list of programs obtained using the object search information of the implicit call in a voice manner through the speaker 141 as indicated by reference numeral 411 of FIG. 4A.

As another example, the electronic device 100 can display an icon on a notification bar indicating that programs corresponding to the object search information of the implicit call are obtained as indicated by reference numeral 412. The electronic device 100 can identify the list corresponding to the icon 412 through an operation of touching or dragging the notification bar. The list corresponding to the icon 412, which can be identified by touching or dragging the notification bar, can be displayed as illustrated in FIG. 6. The electronic device 100 can omit operation 903 when a default program is set corresponding to the implicit call.

In operation 905, the electronic device 100 can execute a relevant program by inputting an execution code of a program to be executed through voice or sound signals through the microphone 142 of the electronic device 100 or by inputting a gesture using the electronic device. In addition, the electronic device 100 can execute a default program when the default program is set corresponding to the implicit call.

In operation 907, the electronic device 100 can display an UI object corresponding to the list of programs (can omit the program that is being executed) obtained in operation 903 on the touchscreen 133 on which the UI operation of the program selected in operation 905 is being displayed. When the program selected in operation 905 is not set to a default program of the implicit call performed in operation 901, the electronic device 100 can display a menu for determining whether to set a default program on a screen on which the UI object is being displayed.

In addition, the electronic device 100 can obtain a list of relevant programs associated with the program that is being executed from the database, and display an UI object corresponding to the relevant programs on the touchscreen 133 on which the UI operation of the program selected in operation 905 is being displayed.

The electronic device 100 can release the display of the UI objects on the program that is running by inputting a reference operation.

The methods according to various embodiments described in the claims and/or specification of the present disclosure can be implemented by hardware, software, or a combination thereof.

When the methods are implemented by software, a computer-readable storage medium can be provided to store one or more programs (software modules). The one or more programs stored in the computer-readable storage medium can be configured for execution by one or more processors in the electronic device 100. The one or more programs can include instructions for causing the electronic device 100 to execute the methods according to the various embodiments described in the claims or specification of the present disclosure.

These programs (software modules or software) can be stored in random access memories (RAMs), nonvolatile memories including flash memories, read only memories (ROMs), electrically erasable programmable ROMs (EEPROMs), magnetic disc storage devices, compact disc-ROMs (CD-ROMs), digital versatile discs (DVDs), other types of optical storage devices, or magnetic cassettes. Also, the programs can be stored in a memory configured by a combination of some or all of such storage devices. Also, each of the memories can be provided in plurality.

Also, the programs can be stored in an attachable storage device that can be accessed by the electronic device 100 through a communication network such as Internet, Intranet, local area network (LAN), wireless LAN (WLAN), or storage area network (SAN), or through a communication network configured by a combination thereof. This storage device can access an electronic device 100 through an external port.

Also, a separate storage device on a communication network can access a portable electronic device 100.

As described above, the various embodiments of the present disclosure searches for or filters out relevant programs based on information of a program to be executed from a data base when the program is executed through an implicit call in an electronic device, thereby providing a method for executing other programs that provide identical or similar functions to that of the program and boosting consumption of various programs or contents.

While the present disclosure has been shown and described with reference to certain exemplary embodiments thereof, it will be understood by those skilled in the art that various changes in form and details may be made therein without departing from the spirit and scope of the present disclosure as defined by the appended claims. Therefore, the scope of the present disclosure is defined not by the detailed description of the present disclosure but by the appended claims, and all differences within the scope will be construed as being included in the present disclosure.

What is claimed is:

1. A method for operating an electronic device, comprising:
   receiving a user input for executing an application;
   filtering, in a database, a plurality of applications including a function associated with information of the application in response to receiving the user input for executing the application;
   providing the filtered plurality of applications;
   receiving a user input to select one of the plurality of applications;
   executing the selected one application; and
   displaying, on a screen of the selected one application being executed, a notification for the filtered plurality of applications during execution of the selected one application.

2. The method of claim 1, further comprising providing a menu that allows a user to set one of the plurality of applications as a default program.

3. The method of claim 1, wherein the selected one application is set as a default application.

4. The method of claim 3, wherein the notification is displayed on at least one of a notification bar or notification window.

5. The method of claim 3, wherein the plurality of applications are obtained from a database of the electronic device.

6. The method of claim 5, wherein the plurality of applications including the function are displayed in a pop-up window.

7. The method of claim 1, further comprising creating an object representing the filtered plurality of applications on a screen.

8. The method of claim 7, wherein the object indicates the function of an instruction for executing the application.

9. The method of claim 1, wherein the filtered plurality of applications are provided by at least one of by a notification bar, a notification window, or a voice output.

10. The method of claim 1, further comprising displaying a menu for a user to select one of the plurality of applications for one-time selection.

11. The method of claim 1, further comprising displaying a third program that is not included in the plurality of applications.

* * * * *